United States Patent [19]
Harada et al.

[11] Patent Number: 4,779,696
[45] Date of Patent: Oct. 25, 1988

[54] VEHICLE SLIP CONTROL APPARATUS

[75] Inventors: Yasuhiro Harada; Kazutoshi Nobumoto; Eizi Nishimura; Toru Onaka, all of Hiroshima, Japan

[73] Assignee: Mazda Motor Corporation, Hiroshima, Japan

[21] Appl. No.: 76,886

[22] Filed: Jul. 23, 1987

[30] Foreign Application Priority Data

Jul. 24, 1986 [JP] Japan ................................ 61-172701
Jul. 24, 1986 [JP] Japan ................................ 61-172702
Jul. 28, 1986 [JP] Japan ................................ 61-175661

[51] Int. Cl.$^4$ ....................... B60K 31/00; B60K 41/20
[52] U.S. Cl. ...................................... 180/197; 303/99; 303/103; 364/426.01

[58] Field of Search ................... 180/197; 303/97, 99, 303/103, 105; 364/425, 426

[56] References Cited

U.S. PATENT DOCUMENTS 3,779,331 12/1973 Burckhardt ........................ 180/197

Primary Examiner—John A. Pekar
Attorney, Agent, or Firm—Wegner & Bretschneider

[57] ABSTRACT

The slip control is conducted so as to cause an amount of the slip of the driven wheel to become a target value by controlling the torque to be transmitted to the driven wheel. The target value is altered during the slip control on the basis of a requirement for road holding capabilities of the driven wheel against a road surface.

17 Claims, 18 Drawing Sheets

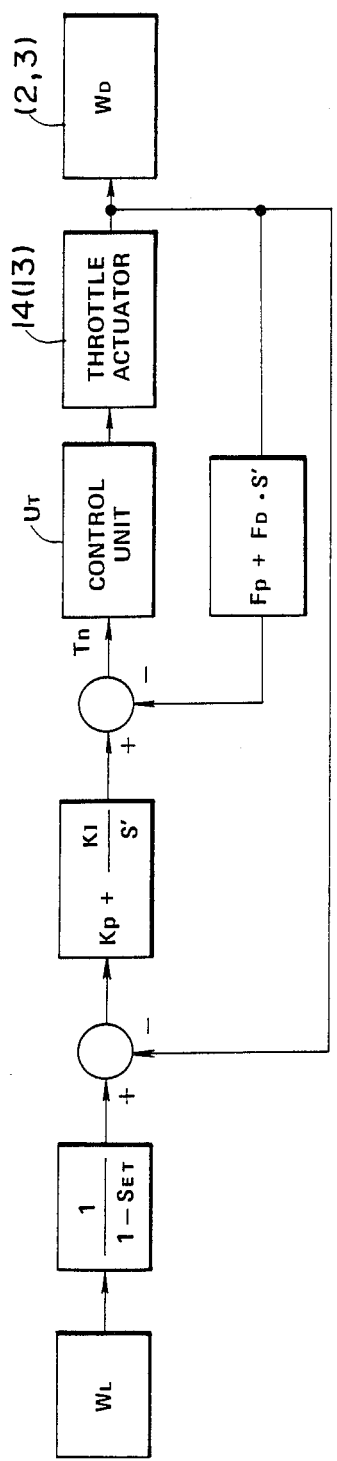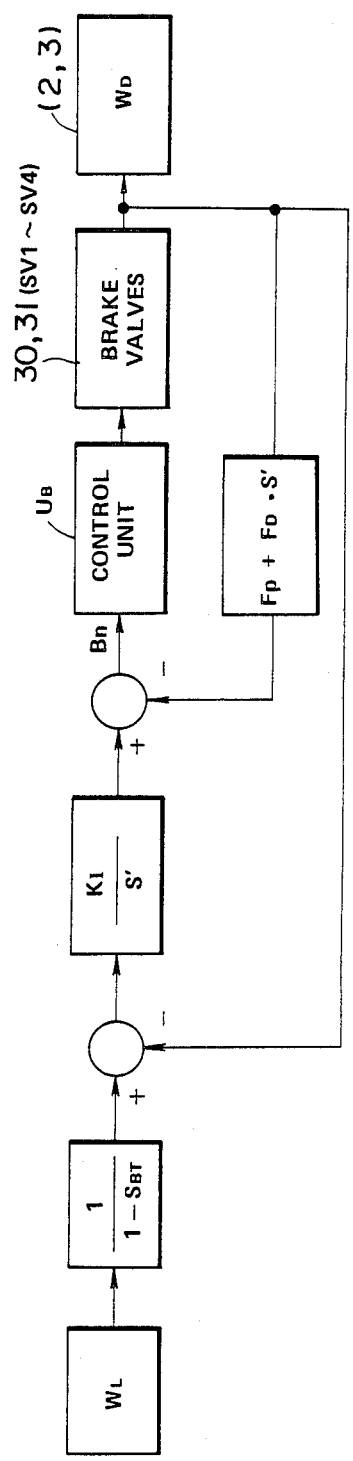

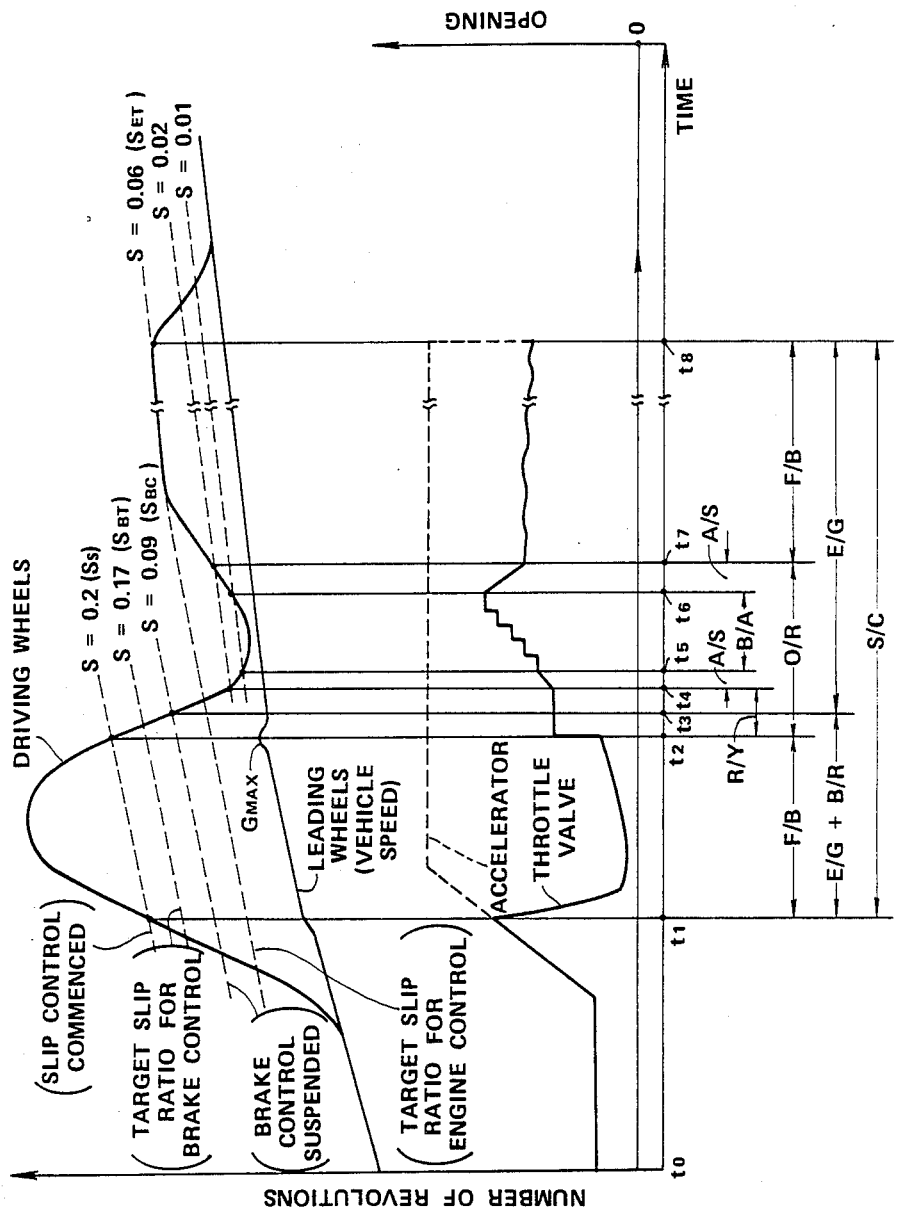

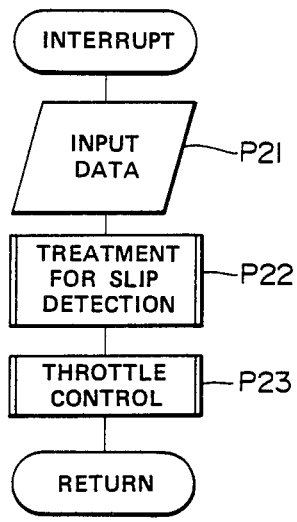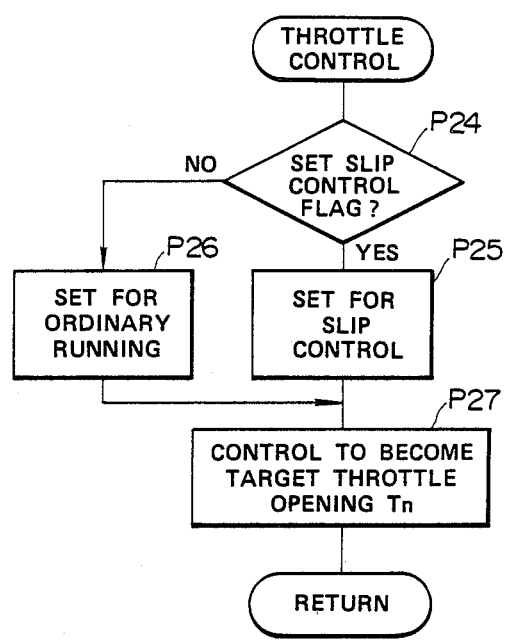

VEHICLE SLIP CONTROL APPARATUS

FIELD OF THE INVENTION

The present invention relates to a vehicle slip control apparatus and, more particularly, to a slip control apparatus of a vehicle designed capable of preventing the driven wheel from slipping or spinning excessively on a road surface by controlling a torque transmitted to the driven wheel.

BACKGROUND OF THE INVENTION

Prevention of the driven wheels from an excessive slip or spinning on a road surface is extremely useful for the sake of safety as well as for an effective use of the driving force of a vehicle. The prevention may be achieved by decreasing a torque to be transmitted to the driven wheels - a torque being the cause of the slip or spinning.

Slip control systems of this type are disclosed in Japanese Patent Early Publication (Laid-Open) No. 16,948/1983 (corresponding to U.S. Pat. No. 4,484,280) and Japanese Patent Early Publication (Laid-Open) No. 56,662/1985 (corresponding to U.S. Pat. No. 4,583,611). The systems disclosed in these two prior patent applications involve, in each case, a technique that involves the application of a braking force of the brake to the driven wheels and a reduction in the output torque of the engine itself in order to decrease the torque to be transmitted to the driven wheels. More specifically, Japanese Patent Early Publication No. 16,948/1983 discloses a system in which the driven wheels only are braked when a slip of the driven wheels is small, on the one hand, and the output torque of the engine is decreased, in addition to the braking of the driven wheels, when the slip of the driven wheels becomes large, on the other hand. Japanese Patent Early Publication No. 56,662/1985 discloses a system in which, when a slip of only one side of the left and right driven wheels is larger than that of the other side thereof, the one side thereof alone is braked and, when slips of both the left and right driven wheels are large, the both sides of the driven wheels are braked and further the output torque by the engine is caused to be reduced. The prior art systems as disclosed in the above patent applications are such that the braking of the driven wheels by the brake is primarily utilized and the reduction in the output torque of the engine is secondarily utilized.

Japanese Patent Early Publication No. 16,948/1983 further discloses an example of the slip control being conducted against the driven wheel on the outside of the curve at the time of cornering. When the vehicle is being cornered, the load applied to the driven wheel on the inside of the curve is reduced, while the torque applied to the driven wheel on the outside of the curve is increased by the action of a differential gear to cause the spin or spinning of the driven wheel on the outside thereof to increase. Furthermore, it is disclosed that a target value in the slip control is altered so as to decrease when a speed of cornering is faster.

As have been described above, in controlling the slip of the driven wheel to eventually reach a certain target value, how to set such a target value is in issue. In particular, requirements for road holding capabilities of the driven wheel against a road surface may vary with a running state of the vehicle so that some measures are demanded to be taken in this respect.

For the requirements for the road holding capabilities of the driven wheel, it will be necessary to understand gripping forces of the tire on a road surface in the longitudinal direction or in the direction of the propulsion and in the transverse direction or in the widthwise direction of the vehicle body. The gripping force of the tire on the road surface in the longitudinal direction (hereinafter referred to merely as the gripping force unless otherwise stated), on the one hand, gets larger as an amount of the slip or spinning of the driven wheel gets larger and, subsequent to a certain peak point, gets smaller as an amount of the slip or spinning thereof gets larger. The gripping force of the tire on the road surface in the transverse direction (hereinafter referred to merely as the transverse force unless otherwise stated), on the other hand, gets smaller as an amount of the slip or spinning of the driven wheel gets larger. Accordingly, for the slip control, it is desirable to set a target value for the slip or spinning of the driven wheel within a range not exceeding the point where the gripping force becomes maximum in order to secure a sufficient transverse force.

It is, on the one hand, to be noted here that a larger gripping force is preferred in order to secure a propulsion, particularly acceleration, of the vehicle. Thus it is desired to set the target value to a possibly large one. It is, on the other, to be noted here that a larger transverse force is preferred in order to secure a stability of the vehicle. Thus it is desired to set the target value to a possibly smaller one.

The magnitudes of the gripping force and the transverse force vary each with a degree of the slip or spinning of the driven wheel against a road surface, viz., a road surface friction coefficient of the driven wheel even if conditions of driving are the same. Factors affecting the degree of the slip or spinning of the driven wheel include, for example, a state of the surface on a road such as a paved road, an unpaved road, a dry road, a wet road and a frozen road and the kind of a tire such as a normal tire, a snow tire and a spike tire. Even if the degrees of the slip or spinning of the driven wheels would be the same, there are occasions, in accordance with a state of the running of a vehicle, where the transverse force is particularly required, for example, at the time of cornering or where a force of the propulsion is particularly required, for example, at the time of the straight running, particularly at the time of acceleration.

As may have been understood from the foregoing, setting the degree of the slip of the driven wheels to a certain target value is to balance the gripping force with the transverse force at a ratio corresponding to the target value. Accordingly, if the target value is kept at a constant value, it becomes impossible to cope with requirements for different road holding capabilities.

The different road holding capabilities are required, for example, at the time of cornering and the straight running and at the time of the ordinary running and acceleration. Firstly, a large transverse force is required at the time of cornering and a large gripping force is required at the time of the straight running. Second, a large transverse force is required at the time of the ordinary running in order to secure a stability of the vehicle and a large gripping force is required at the time of acceleration.

Another issue is how to set a target value for a degree of the slip of the driven wheel at the start-up time of the slip control, vis., an initial value. If the initial value of the slip control is set to a certain value and thereafter the initial value is altered gradually so as to reach a certain target value for the slip control, it takes a long time to cause the target value to reach an optimum value. For instance, if the initial value is set to a small value as a degree of the slip of the driven wheel is small, a sufficient amount of acceleration cannot be obtained at the initial stage during the slip control at the time of the running on a well-conditioned road. To the contrary, if the initial value is set to a large value with acceleration under consideration, the spinning of the driven wheel is likely to occur from a large amount of the slip at the initial stage when the slip control is conducted at the time of the running on a poorly conditioned road. This results in the problem with stability of the vehicle.

SUMMARY OF THE INVENTION

The present invention has the primary object to provide a vehicle slip control apparatus capable of conducting the slip control of the driven wheel by setting a degree of the slip or spinning of the driven wheel to become a predetermined value so as to appropriately meet requirements for road holding capabilities of the driven wheel against a road surface.

The present invention has another object to provide a vehicle slip control apparatus capable of securing a stability of the vehicle at the time of cornering as well as providing a sufficient propulsion at the time of the straight running.

The present invention has a further object to provide a vehicle slip control apparatus capable of satisfying a requirement for a sufficient amount of acceleration as well as securing a stability of the vehicle at the time of the ordinary running.

The present invention has a still further object to provide a vehicle slip control apparatus designed to set a target value for the slip control at the start-up time of the slip control, viz., an initial value to an optimum value.

In order to achieve the above primary object, the slip control apparatus in accordance with the present invention is designed to alter a target value for the slip control so as to meet requirements for the road holding capabilities of the driven wheel against a road surface during the slip control. As shown as a block diagram in FIG. 29, the slip control apparatus is constructed by torque adjusting means for adjusting a torque to be transmitted to the driven wheel; slip detecting means for detecting a state of the slip of the driven wheel on a road surface; slip controlling means for controlling the torque adjusting means to allow a degree of the slip of the driven wheel to become a predetermined target value in response to an output from the slip detecting means; target value altering means for altering the target value during the slip control; and taraget value instructing means for instructing a decrease or increase of the target value to the target value altering means in accordance with a requirement for the road holding capability of the driven wheel on the road surface.

In order to achieve the another object as have been described above, the target value instructing means used to achieve the primary object of the present invention is designed to give an instruction so as to cause a target value to become smaller (viz., the transverse force to get smaller) at the time of cornering than at the time of the straight running by detecting that the vehicle is being cornered.

The further object in accordance with the present invention is achieved by designing the target value instructing means for the primary object of the present invention so as to cause a target value to become larger (viz., the gripping force to become larger) at the time of acceleration required than at the time of the ordinary running by detecting the requirement for acceleration by an operator.

In order to achieve the still further object according to the present invention, the arrangement for achieving the primary object of the present invention further includes initial value setting means for setting an initial value of the target value at the start-up time of the slip control and initial value instructing means for instructing an initial value to the initial value setting means so as to cause the initial value to be set by the initial value setting means to become a value in accordance with a factor affecting an influence on the slip of the driven wheel against a road surface.

Other objects and advantages of the present invention will become apparent during the course of the description of this specification by way of embodiments.

BRIEF DESCRIPTION OF THE DRAWINGS

FIG. 3 is a block diagram illustrating a feedback control of a throttle valve.

FIG. 4 is a block diagram illustrating a feedback control of a brake.

FIG. 5 is a diagramatical graph illustrating a control example in accordance with the present invention.

FIGS. 6 to 11 and FIG. 28 are each a flowchart illustrating a control example in accordance with the present invention.

DETAILED DESCRIPTION OF THE PREFERRED EMBODIMENTS

Brief Description on Overall Construction

Figure 1:
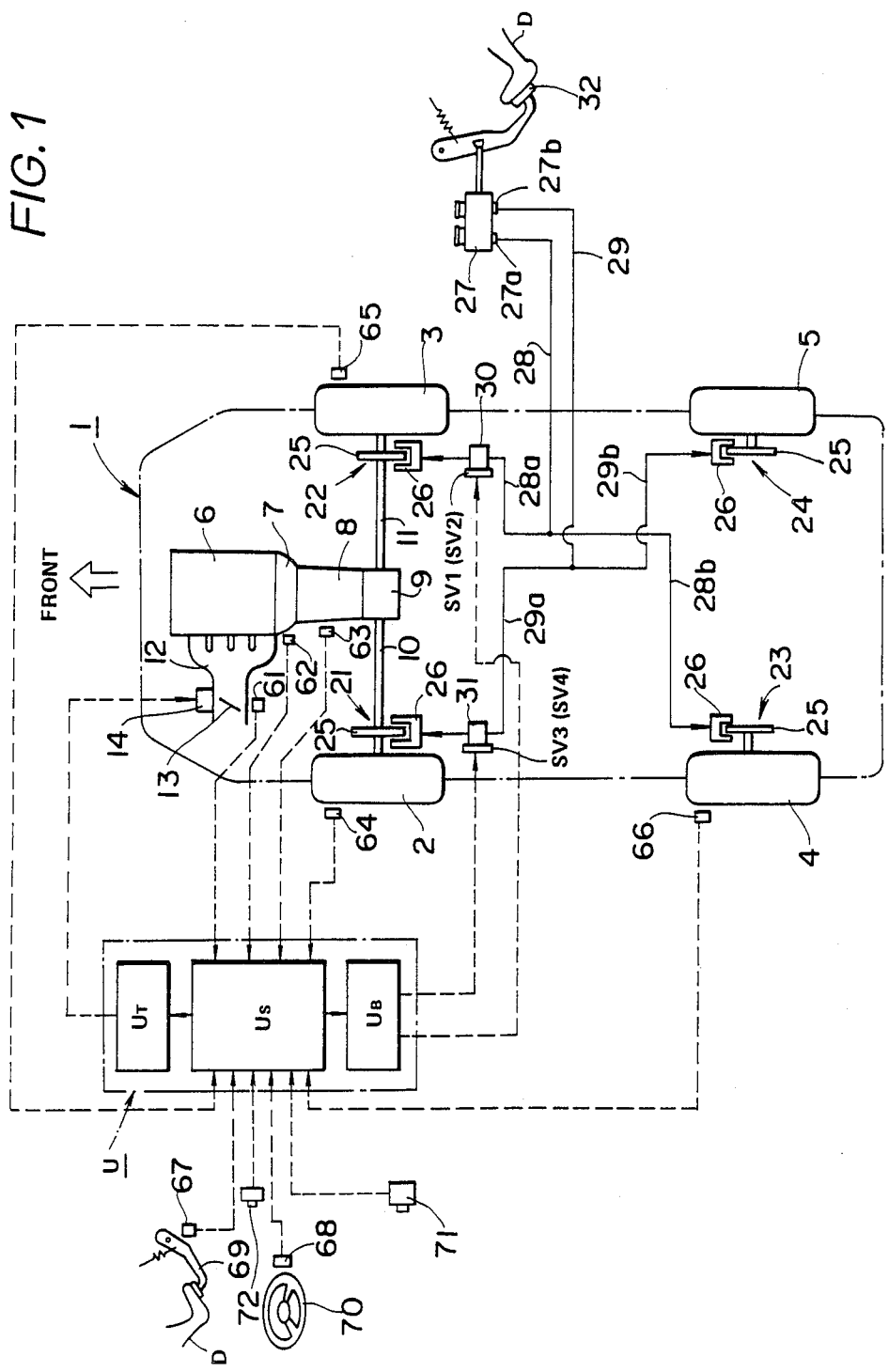
FIG. 1 is an overall schematic diagram illustrating an embodiment according to the present invention.

In FIG. 1, an automobile 1 contains a left front wheel 2 and a right front wheel 3, which function as driven (driving) wheels, and a left rear wheel 4 and a right rear wheel 5, which function as undriven (leading) wheels. In the front of the automobile 1 is mounted an engine 6 as a power source, which generates torques that are transmitted to a clutch 7, a transmission 8 and a differential gear 9 and then through a left drive shaft 10 and a right drive shaft 11 to the respective left and right front wheels 2 and 3 as the driven wheels. In this embodiment, the automobile 1 used is of the FF (front-engine/front-drive) type.

In this embodiment, the engine 6 used as the power source is shown to carry out the load control, that is, a control of the torques generated, by a throttle valve 13 mounted on an air intake passage 12. More specifically, the engine 6 is a gasoline engine of the type that the torques generated are varied with an amount of intake air. The control of the intake air amount may be conducted by the throttle valve 13, and the throttle valve 13 is electromagnetically opened or closed by a throttle actuator 14. The throttle actuator 14 may be composed of, for example, a DC motor, a stepping motor or any appropriate means that may be electromagnetically controlled by fluid pressures such as hydraulic pressures.

The wheels 2 to 5 are provided, respectively, with a brake 21, 22, 23 and 24, each of which may be a disk brake. The disk brake is provided with a disk 25 rotating with the respective wheels and a caliper 26 that holds a brake pad and is provided with a wheel cylinder. The caliper 26 is designed so as to apply a braking force to the disk 25 by pressing the brake pad thereon in accordance with a magnitude of the brake pressure to be supplied on the wheel cylinder.

A master cylinder 27 functioning as a source of the brake pressure may be of the tandem type having two discharging openings 27a and 27b. A braking pipe 28, on the one hand, extends from the discharging opening 27a and it is branched along the line into two branch pipes 28a and 28b, the branch pipe 28a being connected to the brake 22, more specifically, to the wheel cylinder thereof, for the right front wheel and the branch pipe 28b being connected to the bake 23 for the left rear wheel. A braking pipe 29, on the other, extends from the discharging opening 27b and it is branched along the line into two branch pipes 29a and 29b, the branch pipe 29a being connected to the brake 21 for the left front wheel and the branch pipe 29b being connected to the brake 24 for the right rear wheel. As described hereinabove, the braking pipe system may be of a so-called 2-system X type. To the branch pipes 28a and 29a for the respective brakes 21 and 22 of the front wheels functioning as the driven wheels are are connected, respectively, hydraulic pressure control valves 30 and 31 of the electromagnetic type as means for controlling the braking force. It is noted as a matter of course that the brake pressure is generated by the master cylinder 27 in accordance with a stepped amount or force of a brake pedal 32 stepped by an operator d.

Brake Pressure Regulating Circuit

Figure 2:
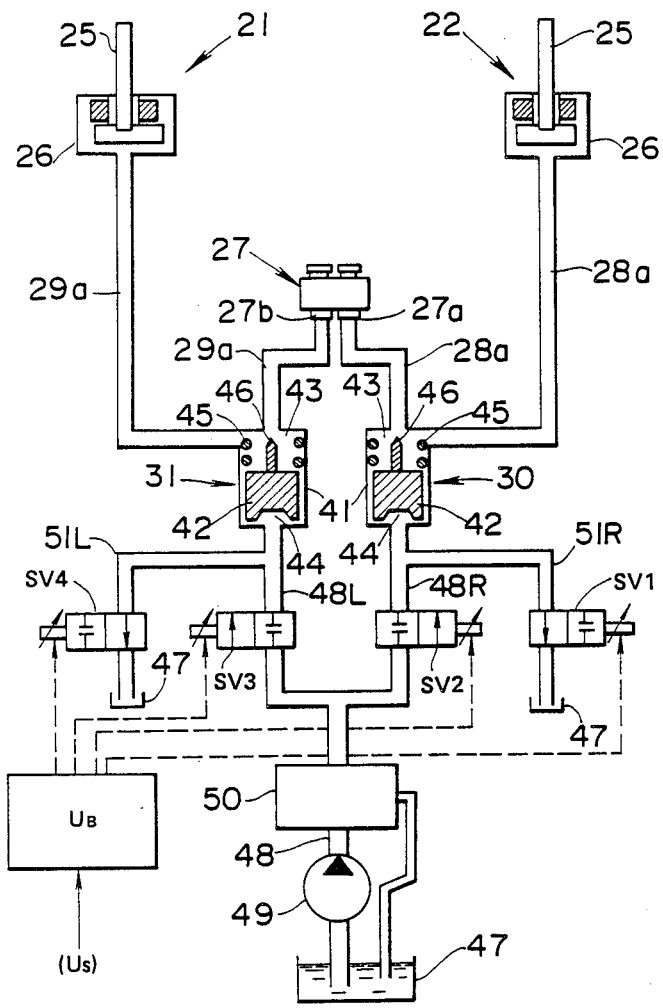
FIG. 2 is a diagram illustrating a hydraulic brake control circuit.

As shown specifically in FIG. 2, each of the control valves 30 and 31 is provided with a cylinder 41 and piston 42 inserted slidably in the cylinder 41. The piston 42 divides the cylinder 41 into a volume-variable chamber 43 and a control chamber 44. The volume-variable chamber 43 works as a passage of the brake pressure against the brakes 21 and 22 from the master cylinder 27. Accordingly, the volume of the volume-variable chamber 43 is caused to vary with a displacement position of the piston 42, thus increasing, decreasing or retaining the brake pressure generated against the brakes 21 and 22.

The piston 42 is always actuated by a return spring 45 in the direction of enlarging the volume in the volume-variable chamber 43. The piston 42 is integrated with a check valve 46. When the piston 42 is displaced in the direction of decreasing the volume in the volume-variable chamber 43, an inlet to the volume-variable chamber 43 is closed, whereby the brake pressure generated by the volume-variable chamber 43 works merely on the brake 21 and 22 and does not act on the brakes 23 and 24 for the rear wheels 4 and 5 functioning as the undriven wheels.

The adjustment of the displacement position of the piston 42 is carried out by the regulation of the hydraulic pressure against the control chamber 44. More specifically, a supply pipe 48 extending from a reservoir 47 is branched along the line into two branch pipes 48R and 48L, one branch pipe 48R being connected to the control chamber 44 of the valve 30 and the other branch pipe 48L being connected to the control chamber 44 of the valve 31. To the supply pipe 48 are connected a pump 49 and a relief valve 50. To the branch pipes 48R and 48L are connected, respectively, supply valves SV2 and SV3 consisting each of an electromagnetically switching (open-close) valve. Each of the control valves 44 is additionally connected to the reservoir 47 through discharge pipes 51R and 51L, the discharge pipe 51R being connected with a discharge valve SV1 consisting of an electromagnetically switching valve and the discharge pipe 51L being connected with a discharge valve SV4 consisting of an electromagnetically switching valve.

When the slip control is effected by the braking using each of the hydraulic pressure regulating valves 30 and 31, the brake does not basically work by way of operation of the brake pedal 32 due to an action of the check valve 46. When the brake pressure to be generated by the hydraulic pressure regulating valve 30 or 31 is small, for example, when the pressure is decreased, the brake works by way of operation of the brake pedal 32. Of course, when no brake pressure for the slip control is generated by the hydraulic pressure regulating valve 30 or 31, a usual braking action arising from operation of the brake pedal 32 works because the master cylinder 27 is caused to communicate with the brake 21 or 22.

Each of the valves SV1 to SV4, inclusive, is controlled by opening or closing by way of a brake control unit $U_B$ as will be described more in detail below. The table below demonstrates relationships of a state of the brake pressure against the brakes 21 and 22 with operation of each of the valves SV1 to SV4, inclusive.

|  | VALVES | | | |
| --- | --- | --- | --- | --- |
|  | SV 1 | SV 2 | SV 3 | SV 4 |
| BRAKE 21 | | | | |
| Increase Pressure | — | — | Opened | Closed |
| Decrease Pressure | — | — | Closed | Opened |
| Retain Pressure | — | — | Closed | Closed |
| BRAKE 22 | | | | |
| Increase Pressure | Closed | Opened | — | — |
| Decrease Pressure | Opened | Closed | — | — |
| Retain Pressure | Closed | Closed | — | — |

Brief Constructions of Control Units

Referring to FIG. 1, reference symbol U denotes generally a control unit group consisting roughly of a throttle control unit $U_T$, a slip control unit $U_S$ and a brake control unit $U_B$. The brake control unit $U_B$ is designed so as to control the opening or closing of each of the valves SV1 to SV4, inclusive, on the basis of signals output from the slip control unit $U_S$. The throttle control unit $U_T$ is to control the driving of the throttle actuator 14 on the basis of signals output from the slip control unit $U_S$.

The slip control unit $U_S$ comprises a computer of the digital type, more specifically, a microcomputer. The slip control unit $U_S$ is provided with signals output from each of sensors or switches 61 to 68 and 71 and 72, inclusive. The sensor 61 is to detect a degree of the opening of the throttle valve 13. The sensor 62 is to detect whether or not the clutch 7 is jointed. The sensor 63 is to detect the number of speeds of the transmission 8. The sensors 64 and 65 are, respectively, to detect the numbers of revolutions of the lefthand and righthand front wheels 2 and 3 as the driven wheels. The sensor 66 is to detect the number of revolutions of the rear wheel 4 as the undriven wheel, that is, a vehicle speed. The sensor 67 is to detect an amount of operation of an accelerator 69, that it, an opening of the accelerator. The sensor 68 is to detect an amount of operation of a steering wheel 70, that is, a steered angle. Each of the sensors 64, 65 and 66 is composed using, for example, a pick-up, and each of the sensors 61, 63, 67 and 68 is composed using, for example, a potentiometer. The sensor 62 comprises, for example, an on/off operating switch.

Figure 18:
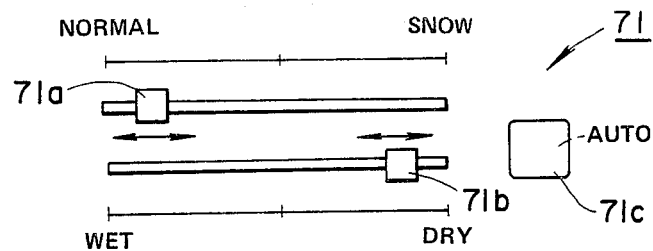
FIG. 18 is a view illustrating an example of a manual switch for setting an initial value.
Figure 19:
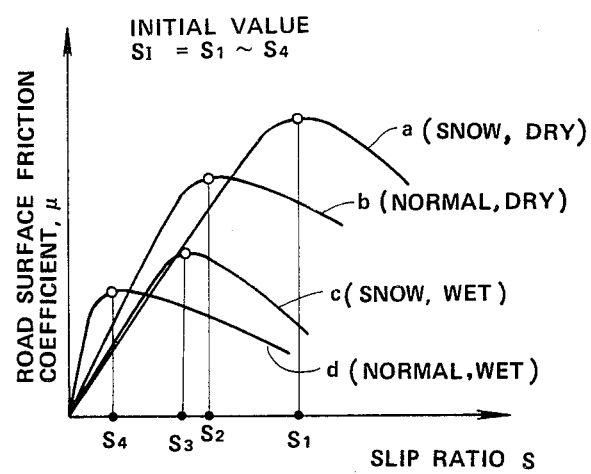
FIG. 19 is a graph illustrating examples of initial values obtained by the manual switch of FIG. 18.

The switch or sensor 71 is to input or select an initial value for a degree of the slip of the driven wheel by the manual operation by the operator D. The switch 71 may be designed to set the initial value using two levers 71a and 71b each of the slide type, as shown in FIG. 18. The lever 71a is to input the kind of tires in accordance with degrees of the gripping forces thereof in a stepwise or non-stepwise manner. for example, the initial value is set so as to get larger when the kind of the tire is snow or spike tires than when the kind of the tire is a normal one. The lever 71b is to input degrees of a tendency of a road surface to slip. The initial value is set so as to get larger when the road surface is dry then when it is wet. A combination of the levers 71a and 71b may enable the initial values $S_1$ to be set by the manual selection, for example, as shown in FIG. 19. There is shown in FIG. 19 an example where $S_1$ is divided into $S_1$ to $S_4$, inclusive. The switch 71 may also be provided with an auto-mode selecticting buttom 71c of the push-push type.

Figure 13:
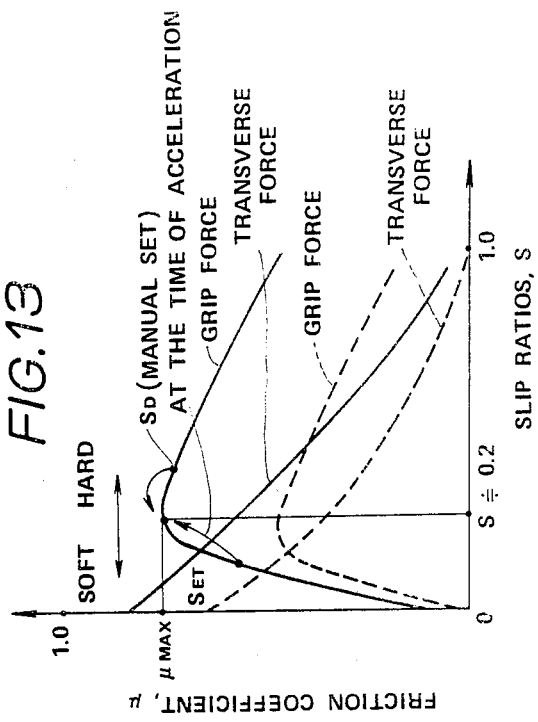
FIG. 13 is a graph showing the relationship of the grip force of the driven wheel with the transverse force thereof and the relationship of slip ratios with road surface friction coefficients.
Figure 26:
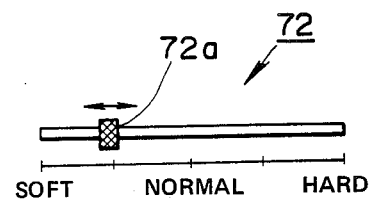
FIG. 26 is a view illustrating an example of a mode selecting switch for manually selecting the target slip ratios.

The buttom 71c is to switch the auto mode to the manual mode and vice versa. When the manual mode is selected, the initial value $S_1$ is determined by a combination of the levers 71a and 71b. When the auto mode is selected, the instruction by the levers 71a and 71b is cancelled and the initial value $S_1$ is selected on the basis of a variation in a running state of the vehicle during the previous slip control. In this embodiment, it is to be noted that the variation in the running state of the vehicle during the slip control may be determined by checking degrees of acceleration of the vehicle body, viz., speeds of the numbers of revolutions of the undriven wheel. The switch 72 is also to input or select a target value (a target slip ratio) for the slip of the driven wheel by the manual operation by the operator D. The switch 72 is constructed so as to input the target slip ratio from a large value ("HARD") to a small one ("SOFT") in a stepwise or non-stepwise manner, using the lever 72 of the slide type, as shown in FIG. 26 (FIG. 13).

The slip control unit $U_S$ is provided basically with a CPU, a ROM, a RAM, a CLOCK and an output/input interface as well as an A/D converter or a D/A converter in accordance with input signals or output signals. This is the same when a microcomputer is employed so that detailed description thereon will be omitted herein for the brevity of description. A description on maps, however, will be made herein by referring to those memorized in a ROM of the control unit $U_s$.

The following is a description on the control manner of the control unit group U. A slip ratio S used therefor may be defined by the following relationship (1):

$$S = \frac{W_D - W_L}{W_D} \tag{1}$$

where
$W_D$ is the number of revolutions of the driven wheels (2 and 3) and
$W_L$ is the number of revolutions of the undriven wheel (4), that is, the vehicle speed.

Throttle Control

Figure 12:
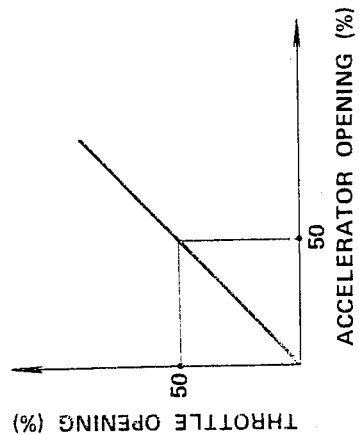
FIG. 12 is a graph illustrating the character of the throttle opening with respect to the accelerator opening when no slip control is conducted.

The throttle control unit $U_T$ is designed to conduct the feedback control of the throttle valve 13 (or the throttle actuator 14) so as to become a target throttle opening. When no slip control is conducted during the throttle control, the target throttle opening is regulated so as to be proportional by a 1-to-1 ratio to the amount of operation of the accelerator 69 by the operator D. FIG. 12 shows one example of the relationship of the throttle opening with the accelerator opening. The throttle control unit $U_T$ is also designed so as to carry out the throttle control for the slip control to become a target throttle opening Tn integrated by the slip control unit $U_S$ without following the characteristics demonstrated in FIG. 12.

The feedback control of the throttle valve 13 using the throttle control unit $U_T$ is designed, in this embodiment, to be carried out by way of the PI-PD control so as to compensate for a variation in response speeds of the engine 6. That is, the opening of the throttle valve 13 is regulated by way of the PI-PD control to coincide the present slip ratio with the target slip ratio during the slip control of the driven wheels. More specifically, the target throttle opening Tn during the slip control can be given by the following relationship (2):

$$T_n = T_{n-1} + K_I \times \left( \frac{W_{LD}}{1 - S_{ET}} - W_{Dn} \right) + \quad (2)$$

$$K_P \times \left( \frac{W_{Ln} - W_{Ln-1}}{1 - S_{ET}} - W_{Dn} + W_{Dn-1} \right) -$$

$$F_P(W_{Dn} - W_{Dn-1}) - F_D(W_{Dn-2} \times W_{Dn-1} + W_{Dn-2})$$

where
$W_L$ is the number of revolutions of the undriven wheel (4);
$W_D$ is the number of revolutions of the driven wheels (2 and 3);
$K_P$ is a proportional coefficient;
$K_I$ is an integral coefficient;
$F_P$ is a proportional coefficient;
$F_D$ is a differential coefficient; and
$S_{ET}$ is a target slip ratio for the throttle control.

As given by the above relationship (2), the numbers of revolutions of the driven wheels are regulated by way of the feedback control so as to cause the throttle opening $T_n$ to become a predetermined target slip ratio $S_{ET}$. In other words, as is apparent from the above relationship (1), the throttle opening is regulated so as for the target revolution numbers of the driven wheels, $W_{ET}$, to have the following relationship (3):

$$W_{ET} = \frac{W_L}{1 - S_{ET}} \quad (3)$$

In FIG. 3, the PI-PD control using the throttle control unit $U_T$ as described above is indicated as a block diagram, in which reference symbol "S'" denotes an operator and suffixes "n" and "n−1" denote, respectively, values of signals at the present sampling time and at the sampling time by one previous to the present sampling time.

Brake Control

At the time of the slip control, the feedback control is effected using the brake control unit $U_B$ such that amounts of the slip of the left and right driven wheels 2 and 3, respectively, are caused to become separate predetermined target slip ratios $S_{BT}$. In other words, the brake control is conducted by way of the feedback control such that the numbers of revolutions of the driven wheels $W_{BT}$ are determined each by the following relationship (4):

$$W_{BT} = \frac{W_L}{1 - S_{BT}} \quad (4)$$

In this embodiment, the target slip ratio $S_{BT}$ for the brake control is determined to a degree larger than the target slip ratio $S_{ET}$ for the engine control, as will be described below. In other words, the slip control in this embodiment is conducted so as to lessen a frequency of the use of the brake by increasing or decreasing the engine output to become the predetermined target slip ratio $S_{ET}$ for the throttle control or the predetermined target slip ratio $W_{ET}$ and, further, by increasing or decreasing the torque by the brake to cause the target slip ratio $S_{ET}$ or the target slip ratio $W_{ET}$ to become larger than the target slip ratio $S_{BT}$ for the brake control or the revolution numbers of the driven wheels $W_{BT}$. Further, in this embodiment, the feedback control as satisfying the relationship (4) is carried out by the I-PD control that is superior in stability. More specifically, an amount of the brake operation (an amount of operation of the pistons 44 in the valves 30 and 31) $B_n$ can be given by the following relationship (5):

$$B_n = B_{n-1} + K_I \left( W_{Ln} \times \frac{1}{1 - S_{BT}} - W_{Dn} \right) - \quad (5)$$

$$F_P(W_{Dn} - W_{Dn-1}) - F_D(W_{Dn} - 2 \times W_{Dn-1} + W_{Dn-2})$$

where
$K_I$ is an integral coefficient,
$K_D$ is a proportional coefficient, and
$F_D$ is a differential coefficient.

When the amount of the brake operation $B_n$ is larger than zero, the brake pressure is decreased. When the amount of the brake operation $B_n$ is equal to or smaller than zero, the brake pressure is increased. The brake pressure is increased or decreased by opening or closing the valves SV1 to SV4, inclusive, as have been described above. Adjustment of speeds of the increase or decrease in the brake pressure is made by adjusting ratios of the opening time to the closing time (duty ratios) of the valves SV1 to SV4, inclusive, by way of the duty control that is proportional to the absolute value of the brake operation amount $B_n$ given by the relationship (5) above. Accordingly, the absolute value of the brake operation amount $B_n$ becomes proportional to the speed of a variation in the brake pressures, and the duty ratio determining the speed of the increase or decrease in the brake pressures indicates the brake operation amount $B_n$.

FIG. 4 indicates the I-PD control using the brake control unit $U_B$, as have been described above, as a block diagram, in which reference symbol "S'" denotes an operator.

Brief Description on Overall Slip Control System

An overall system of the slip control will be described herein with reference to FIG. 5 where reference symbols and figures have the following meanings:
S/C: region of the slip control;
E/G: slip control by the engine;
B/R: slip control by the brake;
F/B: feedback control
O/R: open loop control
R/Y: recovery control
B/A: backup control
A/S: absorb (shockless) control
S=0.2: slip ratio at the time of commencement of the slip control ($S_S$)
S=0.17: target slip ratio by the brake ($S_{BT}$)
S=0.09: slip ratio at the time of suspension (cancellation) of the slip control by the brake ($S_{BC}$)
S=0.06: target slip ratio by the engine ($S_{ET}$)
S=0.01–0.02: slip ratio in the region where the absorb control is effected
S=≦0.01: slip ratio in the region where the backup control is effected It is to be noted herein that the above figures are based on data obtained by actually driving a vehicle with spike tires on a frozen road surface. Furthermore, it is noted that the figures S=0.01–0.02 in the region where the absorb control is effected and the slip ratio S=0.09 at the time of the suspension of the slip control by the brake are set as invariable, respectively, on the one hand, and that the target slip ratio $S_{BT}$ for the brake control, the target slip ratio $S_{ET}$ for the engine control and the slip ratio $S_S$ at the start-up time of the slip control vary with a state of road surfaces, on the other hand. In FIG. 5, the target slip ratio $S_{BT}$ for the brake control, the target slip ratio $S_{ET}$ for the engine control and the slip ratio $S_S$ at the start-up time of the slip control are set as 0.17, 0.06, and 0.2, respectively, as one example. It is also noted that the figure S=0.2 for the slip ratio at the start-up time of the slip control uses a slip ratio at the time of the occurrence of a maximum gripping force to be obtained when the spike tires are employed, as referred to by the solid line in FIG. 13. The reason why the slip ratio at the start-up time of the slip control is set as large as S=0.2 is so as to enable an actual slip ratio at the time when the maximum gripping force is produced to be given. The target slip ratios $S_{BT}$ and $S_{ET}$ for the engine and brake controls, respectively, are corrected in accordance with the slip ratio at the time of the occurrence of the maximum gripping force. In FIG. 13, the solid line demonstrates a variation in the relationship of magnitudes of the gripping forces and transverse forces, represented as friction coefficients against road surfaces, during the use of spike tires with the corresponding slip ratios. And the broken line demonstrates a variation in the relationship of magnitudes of the gripping and transverse forces, represented as friction coefficients against road surfaces, when normal tires are employed, with the corresponding slip ratios. As shown in FIG. 13, the target slip ratio $S_D$ that may be selected manually by the switch 72 at the time of running on a frozen road with spike tires is set so as to range from a value ("HARD") larger a little bit than the point when the maximum griping force occurs to a value ("SOFT") smaller sufficiently than the point when the maximum gripping force occurs.

Given the above description, FIG. 5 will be described in the course of time.

(1) From $t_0$ to $t_1$:

No slip control is conducted over the course of time from $t_0$ to $t_1$ because the slip ratio S does not exceed S=0.2 that is the condition for the start-up of the slip control. In other words, when the slip of the driven wheels is small, acceleration can be enforced without the slip control, thereby utilizing a large gripping force. It is a matter of course that, during this period of time, the peculiar character of the throttle opening against the accelerator opening is determined to be constant as demonstrated in FIG. 12.

(2) From $t_1$ to $t_2$:

At this point $t_1$ the slip control is commenced, and the slip ratio is equal to or higher than the point (S=0.09) of the suspension of the slip control by the brake. During the course of time, the slip ratio is so relatively large that the slip control is conducted by the decreasing generation of the torques by the engine and by the regulation by the brake. It is also noted that, since the target slip ratio (S=0.17) for the brake control is higher than the target slip ratio (S=0.06) for the engine control when an amount of the slip is large (S>0.17), on the one hand, brake pressures are applied to the brake and that, since the slip is controlled so as to be reduced by the control of the engine only when the slip is small (S<0.17), on the other, no brake pressures are applied thereto.

Figure 15:
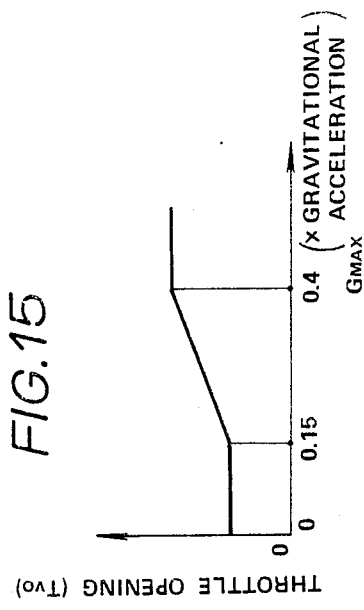
FIG. 15 is a graph showing the optimum throttle opening corresponding to the maximum acceleration during the recovery control.

(3) From $t_2$ to $t_4$ (recovery control):

During the course of a predetermined time (for example, 170 msec) after the reduction of the slip (S<0.2), the throttle valve 13 is retained at a predetermined opening (open loop control). At the point of S=0.2 ($t_2$), the maximum acceleration $G_{MAX}$ is given, and the maximum road surface friction coefficient μ (the maximum gripping force of the driven wheels) is estimated from the maximum acceleration $G_{MAX}$. The throttle valve 13 is retained for a predetermined period of time, as have been described above, so as to cause the driven wheels to produce the maximum gripping forces. This control is carried out with the attempt to prevent the acceleration G of the vehicle body from being reduced immediately after the lip reduced, when a response of the feedback control is not in time because the rapid occurrence of the slipping reduction. If the reduction of the slip is predicted, that is, when the slip ratio is decreased below S=0.2, a predetermined torque is secured in advance so as to enlarge acceleration. The recovery control is particularly effective to avoid the excessive reduction in the slip ratio on account of a failure of the recovery control, leading to less acceleration or to avoid the re-occurrence of a large amount of the slip by way of the excessive recovery control because the amount of the torques is increased in accordance with the occurrence of the slip as shown in FIG. 15. It is noted therein that, although the maximum acceleration $G_{MAX}$ is the one obtained at the start-up time of the slip control, that is, at the time $t_1$ in FIG. 5, a maximum acceleration $G_{MAX}$ at the time when the slip is being reduced as in this embodiment, that is, at the time $t_2$ in FIG. 5, is said to reflect a state of road surfaces more accurately if it is used as an amount of the torques increased by the recovery control.

The optimum throttle opening $T_{VO}$ for providing the driven wheels with torques capable of generating the maximum gripping force can be theoretically given by a torque curve of the engine 6 and a transmission gear ratio. In this embodiment, however, the optimum throttle opening $T_{VO}$ is determined on the basis of a map, for example, as demonstrated in FIG. 15. The map is prepared in accordance with experimental procedures, in which the maximum acceleration $G_{MAX}$ is determined to become a constant value when it is equal to or lower than 0.15 or it is equal to or higher than 0.4 with measuring errors under consideration. It is to be noted here that, since the map indicated in FIG. 15 is prepared on the basis of a particular speed mode such as, for example, the first speed mode, a map for any other speed mode can be prepared by correcting the optimum throttle opening $T_{VO}$.

(4) From $t_4$ to $t_7$ (backup control and absorb control):

The backup control is designed to be conducted (open loop control) in order to cope with an unusual reduction in the slip ratio S. That is, when the slip ratio S becomes lower than S=0.01, the feedback control is stopped and the opening of the throttle valve 13 is caused to become larger in a stepwise manner.

When the slip ratio is between 0.01 and 0.02 in the course of time from $t_4$ to $t_5$ and from $t_6$ to $t_7$, the absorb control is conducted for a smooth transfer to the next feedback control.

The backup control is conducted when neither the feedback control nor the recovery control can work effectively. The backup control to be used here is designed so as to allow a response time to become sufficiently faster than the feedback control.

A rate of the throttle opening in the backup control, in this embodiment, is designed so as to be increased for every 14 msec of the sampling time by 0.5% of the previous throttle opening.

Figure 16:
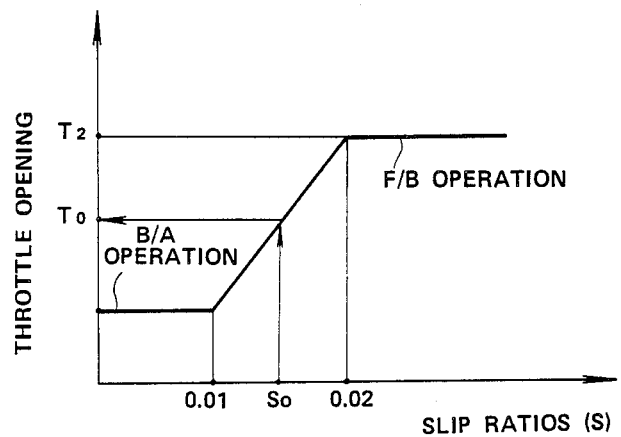
FIG. 16 is a graph showing the relationship of slip ratios for the absorb control with the throttle opening.

In the absorb control, as shown in FIG. 16, a throttle opening $T_o$ is determined by proportionating a throttle opening $T_1$ obtained by the operation of the backup control and a throttle opening $T_2$ obtained by the operation of the feedback control with the present slip ratio $S_o$.

(5) From $t_7$ to $t_8$:

By continuing the control conducted until the point $t_7$, the control is caused to be transferred smoothly into the slip control by the engine along.

(6) $t_8$ et seq.

The slip control is suspended because the accelerator 69 is fully closed by the operator D. At this time, there is no risk of the re-occurrence of the slip, even if the throttle opening of the throttle valve 13 is left in the discretion of the operator D, because the torque is caused to be decreased to a sufficient level. In this embodiment, the slip control is caused to be suspended, in addition to the full closure of the accelerator 69, when the target throttle opening by the slip control becomes smaller than the throttle opening corresponding to the accelerator opening operated by the operator D, as determined by FIG. 12.

It is noted herein that, in the course of transferring from a state where the slip control is conducted by both the engine and the brake to a state where the slip control is conducted by the engine alone, the slip control by the brake is suspended at the point $t_3$, that is, at the point of the slip ratio being $S_{BC}$. Accordingly, the brake pressure is completely released and becomes zero after the point $t_3$, so that the slip control is allowed to be conducted by the engine alone without any remaining influence from the brake. It is further noted herein that the brake pressure is caused to be sufficiently low in the course of transferring into the slip control by the engine alone because the target slip ratio $S_{BT}$ for the brake control is set to be larger than the target slip ratio $S_{ET}$ for the engine control, and the slip ratio $S_{BC}$ at the time of the brake release is set between the two target slip ratios, so that n slip is likely to occur again at the time $t_3$ when the brake is released.

It is also to be noted that the target slip ratio $S_{ET}$ for the engine control is set smaller at the time of cornering than at the time of the straight running. The reason why the target slip ratio $S_{ET}$ for the engine control alone is set smaller is because the fact that the target slip ratio $S_{BT}$ for the brake control itself is sufficiently larger than that appropriate at the time of cornering is taken into consideration. However, it is possible to render the target slip ratio $S_{BT}$ for the brake control smaller at the time of cornering. In this embodiment, whether or not the vehicle is being cornered may be detected from a state of operation of the steering wheel 70; there may be employed for this purpose various parameters such as the transverse force acting on the vehicle body and any other parameters and techniques that have been conveniently used for detecting the cornering.

DETAILED DESCRIPTION OF SLIP CONTROL

In accordance with the present invention, the overall slip control system will be described below with reference to FIGS. 6 to 11, inclusive. In this embodiment, it should be noted that the control also can be made using the brake control in order to free the vehicle from the mud or the like - this control will be referred to herein as a so-called "stuck control". In the following description, reference symbol P denotes a step.

Figure 6A:
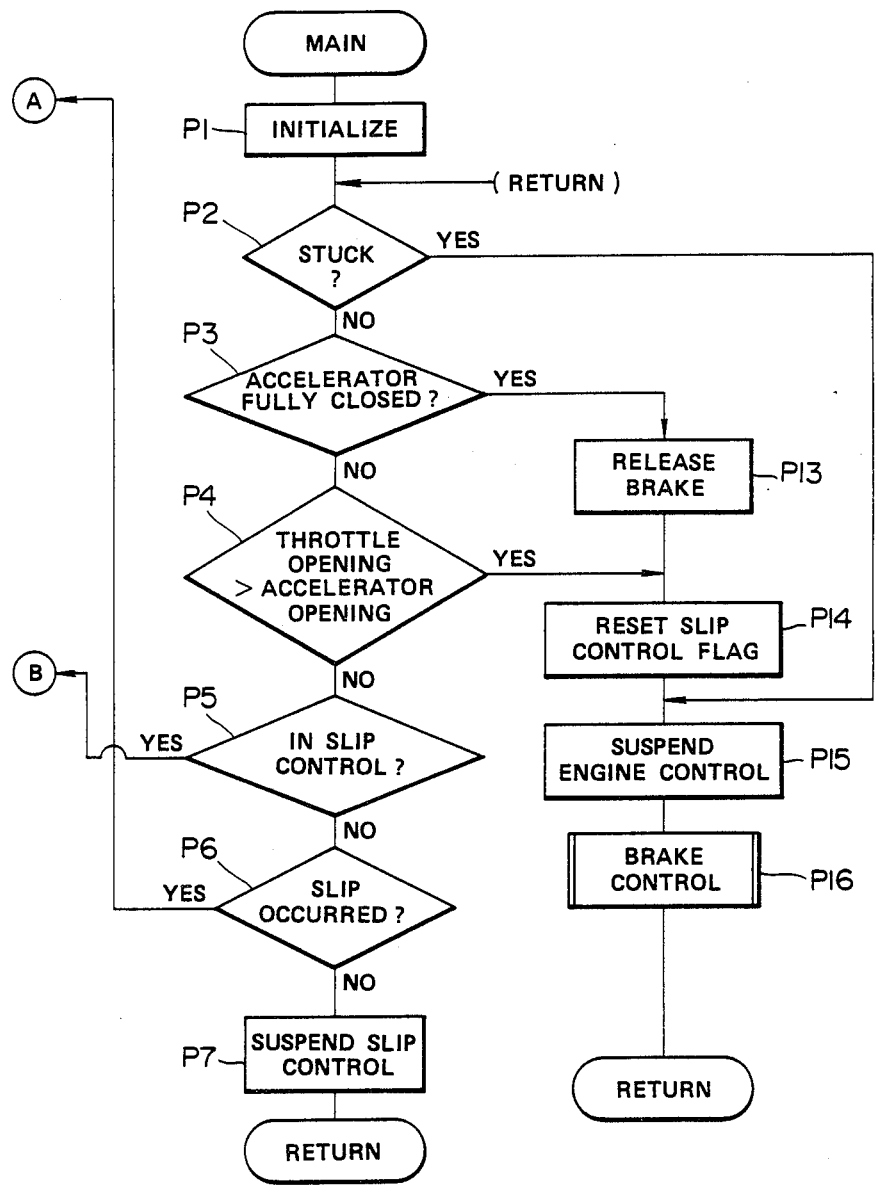
Figure 6B:
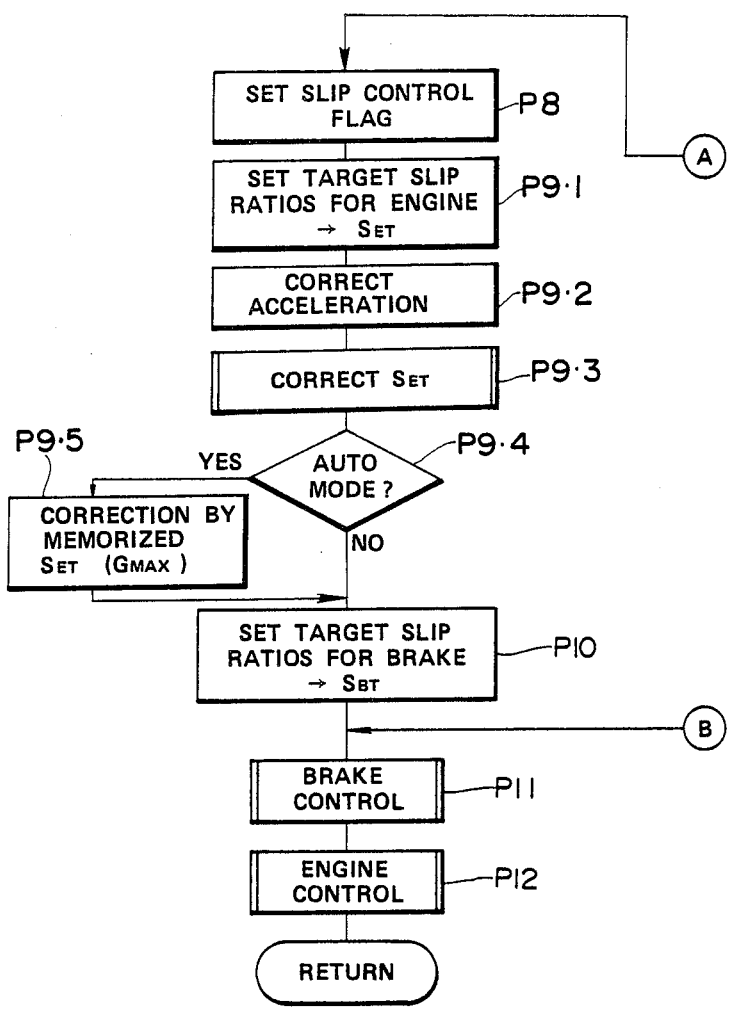

FIG. 6 (Main Routine)

In P1, the system is initialized, and it is discriminated in P2 whether or not a vehicle is stuck in the mud or the like and it is in a stuck and unmovable state. This discrimination is made by checking whether or not a so-called "stuck" flag is set as will be described below. If NO in P2, the flow proceeds to P3 and it is then discriminated whether or not the accelerator 69 is completely closed. If NO in P3, it is then discriminated in P4 whether or not the present throttle opening is larger than the accelerator opening. If it is discriminated as NO in P4, the flow proceeds to P5 where it is discriminated whether or not the slip control is under way. This discrimination is conducted by checking whether or not a slip control flag is set. If NO in P5, it is discriminated in P6 whether or not there would have occurred a slip to a degree such that the slip control is required. This is discriminated by seeing whether a slip flag is set each for the left front wheel 2 and the right front wheel 3. If it is discriminated NO in P6, the flow proceeds to P7 and the slip control is suspended, leading to the normal driving.

If YES in P6, the flow proceeds to P8 where a slip control flag is set. Then, in P9-1, an initial value $S_I$ (S=0.06 as in this embodiment) of the target slip ratio $S_{ET}$ for the engine (throttle) control is set in accordance with a state of operation of the buttom 71a or 71b of the switch 71. Thereafter, the initial value of the target slip ratio $S_{ET}$ for the engine control is corrected in P9-2 upon requirement for acceleration as will be described below. Then, in P9-3, the initial value for the target slip ratio $S_{ET}$ is corrected to become a value appropriate at the time of cornering, as will be described below.

After P9-3, it is discriminated in P9-4 whether or not the auto mode is currently selected by the buttom 71c of the switch 71. If NO in P9-4, the flow proceeds to P10 without correction of the initial value $S_1$ of the target slip ratio $S_{ET}$ for the engine control. If YES in P9-4, the initial value $S_1$ set at P9-1~P9-3 is cancelled in P9-5 and the initial value $S_1$ is set as a value corresponding to the target slip ratio $S_{ET}$ memorized at P79, as will be described below.

In P10, the initial value (S=0.17 as in this embodiment) of the target slip ratio $S_{BT}$ for the brake control is set. Thereafter, for the slip control, the brake control is effected in P11 and the engine control in done in P12, as will be described below. It is to be noted here that the determination of the initial values in both P9 and P10 is done on the basis of the maximum acceleration $G_{MAX}$ obtained by the previous slip control from the similar point of view as in P76 below.

If YES in P5, the flow proceeds to P11 and the slip control continues to be done.

If YES in P4, it is shown that no slip control is required and the flow advances to P14 where a slip control flag is reset. Then, the engine control is suspended in P15, and the brake control is conducted in P16. This brake control in P16 is done so as to cope with a state where the vehicle is stuck.

If it is discriminated YES at P3, the flow proceeds to P13 where the brake is released and treatments subsequent to P14 will be done.

If YES in P2, the flow proceeds to P15 and the treatments following P15 are conducted.

FIGS. 7 and 8

The flowchart demonstrated in FIG. 7 is designed so as to interrupt into the main flowchart demonstrated in FIG. 6, for example, in every 14 msec.

In P21, signals from each of the sensors 61 to 68, inclusive, are input for data treatments. The flow then proceeds to P22 where the treatment of a slip detection is conducted, and the throttle control is conducted in P23.

The throttle control in P23 is effected in accordance with a flowchart demonstrated in FIG. 8. In P24, it is discriminated whether or not a slip control flag is set to check whether or not the slip control is currently under way. If YES in P24, the throttle valve 13 is operated so as to select a control mode capable of reaching the predetermined target slip ratio $S_{ET}$ for the slip control without following the peculiar character demonstrated in FIG. 12. If NO in P24, the flow proceeds to P26 and the opening or closing of the throttle valve 13 is regulated by the operator D in his discretion, leading to the peculiar character demonstrated in FIG. 2. Subsequent to P25 or P26, the control is carried out, in P27, to realize a target throttle opening, as will be described below. That is, the control following P68, P70 and P71 and the control following the character of FIG. 12 are conducted as will be described below.

Figure 9A:
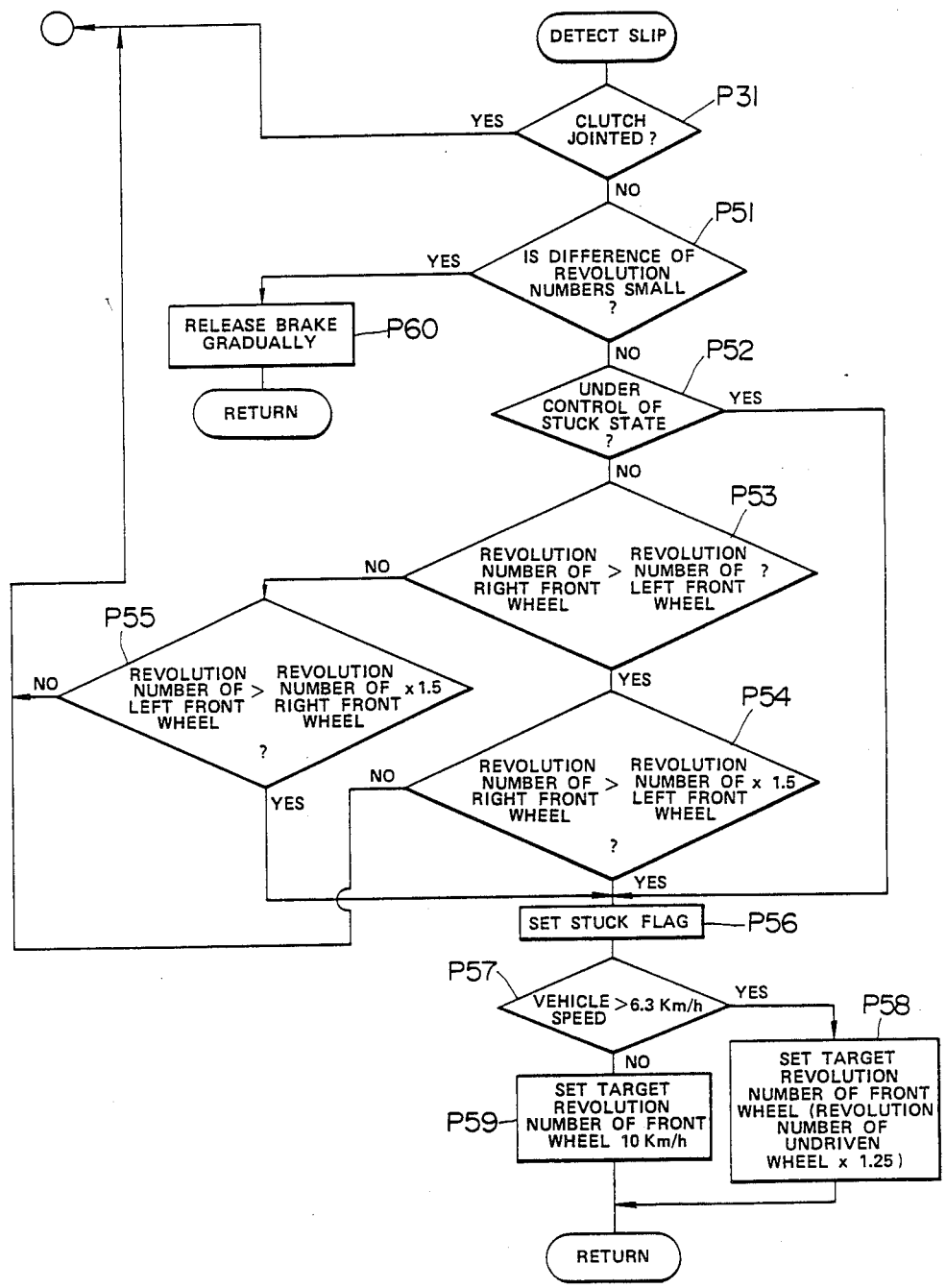
Figure 9B:
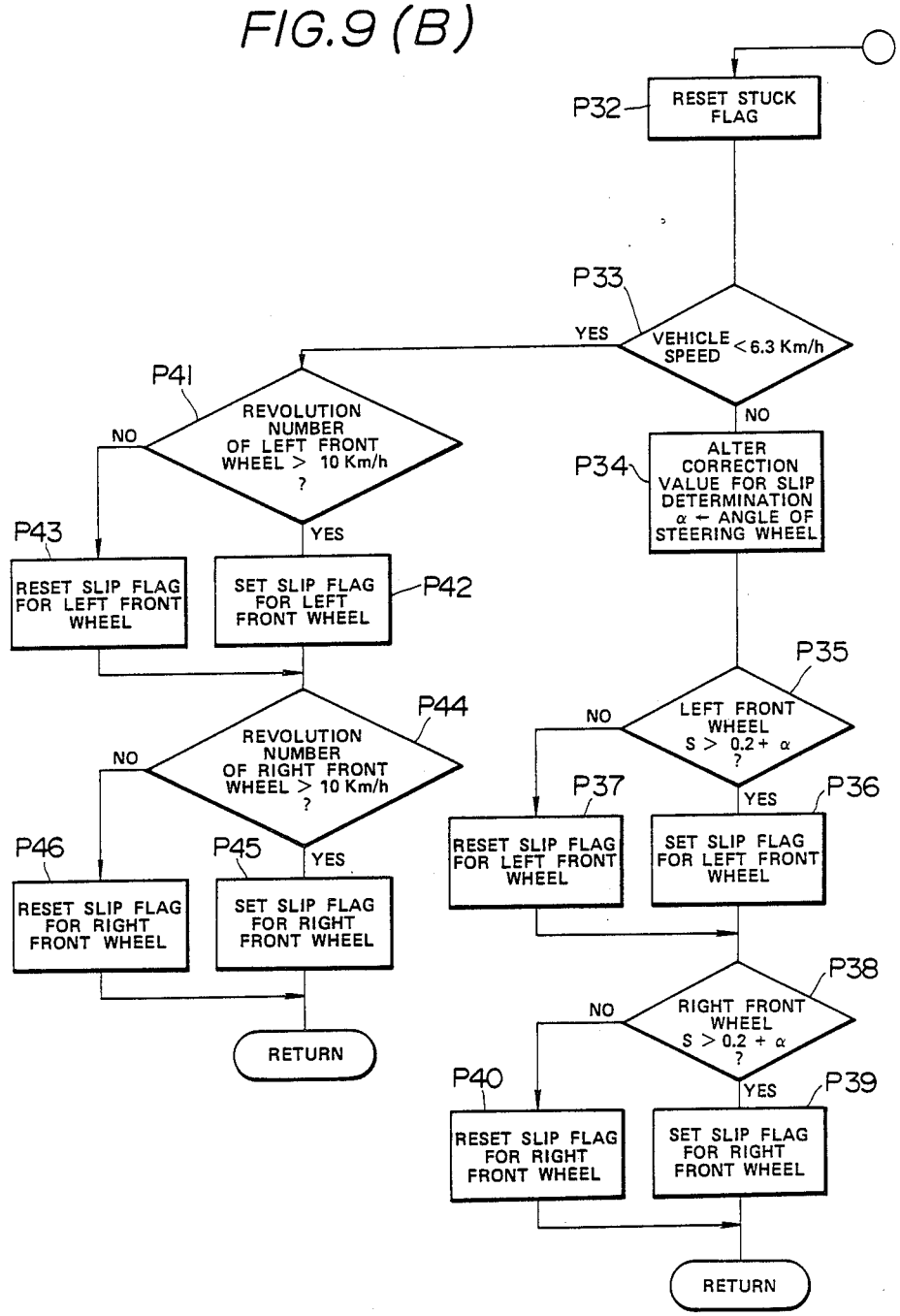

FIG. 9 (Slip Detection)

The flowchart of FIG. 9 corresponds to P22 of FIG. 7 and is to detect whether or not the slip subject to the control has occurred and whether or not a vehicle is in a stuck state.

In P31, it is discriminated whether or not the clutch 7 is completely connected. If YES in P31, it is found that the vehicle is not stuck. Then, the flow proceeds to P32 where a "stuck" flag is reset and, in P33, it is discriminated whether or not the present vehicle speed is as slow as, for example, below 6.3 km/h.

Figure 14:
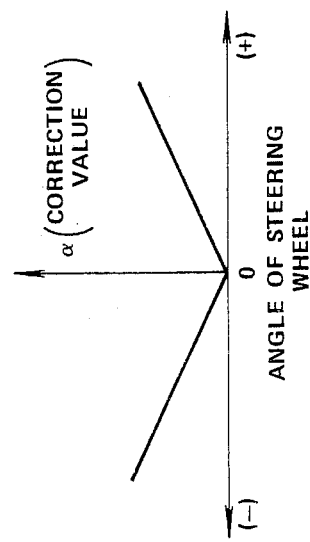
FIG. 14 is a graph showing correction values for correcting slip ratios at the commencement of the slip control in accordance with angles of the steering handle.

If NO in P33, the flow proceeds to P34 where a correction value $\alpha$ for the slip detection is computed in accordance with a steered angle of the steering wheel 70, as referred to in FIG. 14. Thereafter, in P35, it is discriminated whether or not a slip ratio for the left front wheel 2 as the lefthand driven wheel is larger than an addition of the above correction value $\alpha$ to the predetermined reference value of 0.2, that is, $0.2 + \alpha$. If YES in P35, on the one hand, it is found that the left front wheel 2 is in a state of slippage so that a slip flag is set in P36. If NO in P35, the flow proceeds to P37 where a slip flag for the left front wheel 2 is reset. It is noted here that the correction value $\alpha$ is determined with a difference of revolutions between the inner and outer wheels at the time of the slipping, particularly a difference of revolutions between the driven wheel and the undriven wheel.

Subsequent to P36 or P37, a slip flag for the right front wheel 3 is set in P38 to P39 and reset P38 to P40 is substantially the same manner as described above on the left front wheel 2.

When it is discriminated as YES in P33, the vehicle speed is so slow that the computation of the slip ratio based on the relationship (1) utilizing the vehicle speed is predicted to give high errors in measurement. Accordingly, in this case, a state of slippage is determined merely by the detection of the number of revolutions of the driven wheel. That is, in P41, it is discriminated whether or not the number of revolutions of the left front wheel 2 is larger than that corresponding to the vehicle speed of 10 km/h. If YES in P41, a slip flag for the left front wheel 2 is set in P42 and, if NO in P41, a slip flag for the left front wheel 2 is reset.

After P42 and P43, a slip flag for the right front wheel 3 is set or reset in P44, P45 and P46 in substantially the same manner as in P41 to P43.

In P31, if it is discriminated as NO, there is the possibility that the vehicle is stuck. In this case, the operator D will try to get the vehicle free from the stuck state, as in the mud, with the clutch connected halfway. At this moment, the flow moves to P51 where it is discriminated whether or not a difference of the revolution numbers between the left and right front wheels 2 and 3 as the driven wheels is small (for example, as large as 2 km/h, when the number of revolutions is translated into the vehicle speed). If NO in P51, it is discriminated in P52 whether or not the vehicle is currently in the progress of the stuck control. If NO in P52, it is discriminated in P53 whether or not the number of revolution of the right front wheel 3 is larger than the number of revolutions of the left front wheel 2. If YES in P53, it is discriminated in P54 whether or not the number of revolutions of the right front wheel 3 is larger than 1.5 times as much as the number of revolutions of the left front wheel 3. If YES in P54, on the one hand, the stuck flag is set in P56 and, if NO in P54, on the other hand, it is found that the vehicle is not stuck so that the treatments following P32, as described above, will be carried out.

If NO in P53, it is discriminated in P55 whether or not the number of revolutions of the left front wheel 2 is larger than 1.5 times as much as the number of revolutions of the right front wheel 3. If YES in P55, the flow proceeds to P56 and, if NO in P55, the flow proceeds to P32.

After P56, it is discriminated in P57 whether or not the vehicle speed is faster than 6.3 km/h. If YES in P57, it is set in P58 such that the numbers of revolutions of the front wheels 2 and 3 become 1.25 times as much as the numbers of revolutions of the respective undriven wheels representing the vehicle speed equivalent to the slip ratio $S = 0.2$. If NO in P57, the target numbers of revolutions of the front wheels 2 and 3 are set to be equivalent each to the vehicle speed of 10 km/h in P59.

If YES in P51, the brake is released gradually in P60. If YES in P52, the flow proceeds directly to P56 without any treatment in P53, P54 and P55.

Figure 10:
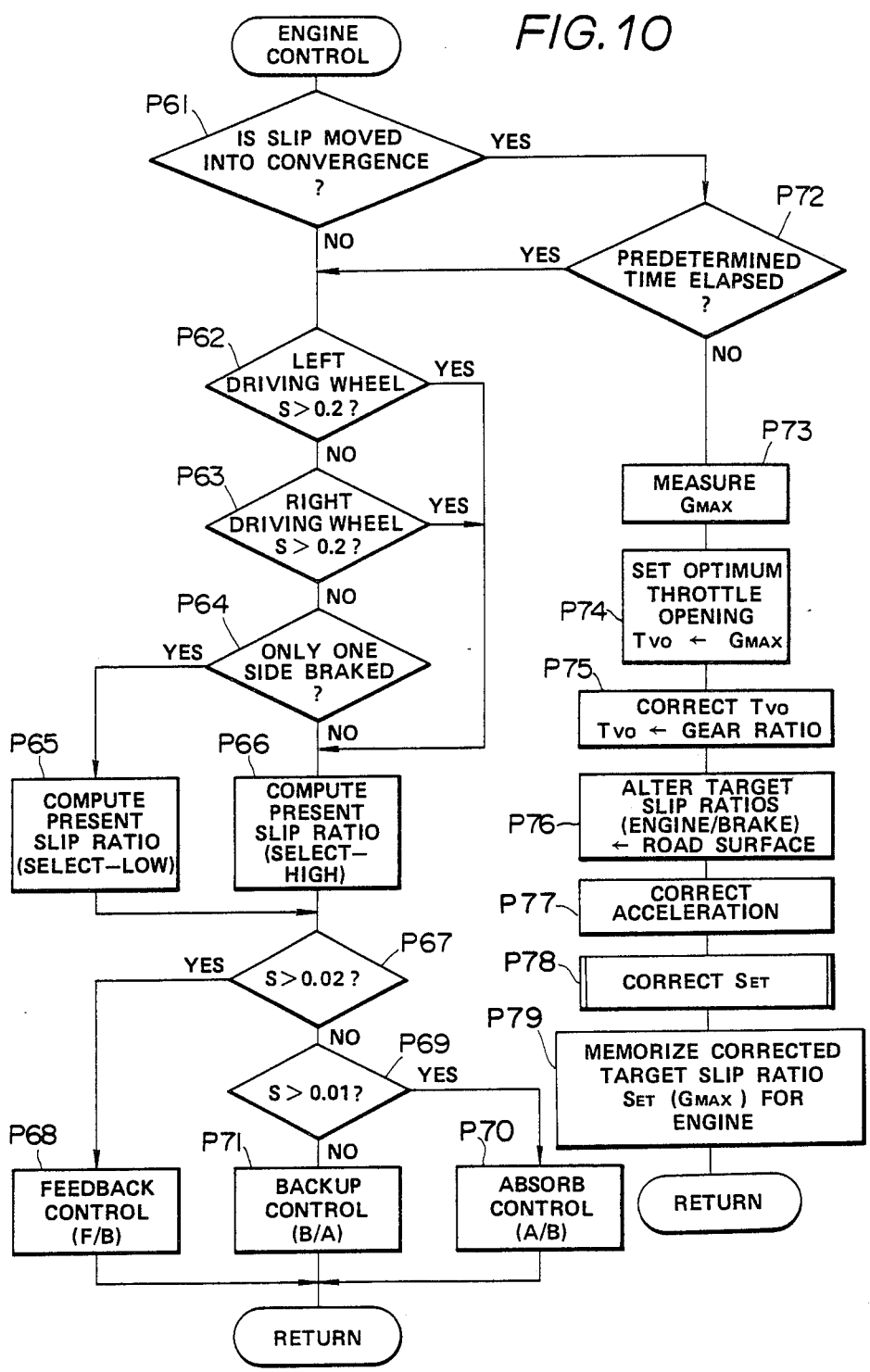

FIG. 10 (Engine Control)

The flowchart of FIG. 10 corresponds to P12 of FIG. 6

In P61, it is discriminated whether or not a state of the slip is moved into a reducing state, that is, whether or not the point $t_2$ of FIG. 5 is passed. If NO in P61, it is discriminated in P62 whether or not the slip ratio of the left front wheel 2 is larger than $S = 0.2$. If NO in P62, it is discriminated in P63 whether or not the slip ratio of the right front wheel 3 is larger than $S = 0.2$. If NO in P63, it is discriminated in P64 whether or not only one side of the left and right front wheels 2 and 3 is under the brake control, viz., whether or not the vehicle is running on a split road. If YES in P64, on the one hand, the flow proceeds to P65 and the present slip ratio is set to the driven wheel with the lower slip ratio (select-low). If NO in P64, on the other hand, the flow proceeds to P66 and the present slip ratio is set to the driven wheel with the higher slip ratio (select-high). If YES in P62 and in P63, the flow proceeds to P66 in each case.

The select-high step in P66 is to enable a frequency of the braking to be lessened more by computing the present slip ratio in such a way that the slip of the driven wheel that is likely to slip more than the other driven wheel is controlled. The select-low step in P65 is to enable the slip of the driven wheel likely to slip more than the other to be controlled by the brake and, at the same time, to enable the driving of the vehicle using the gripping force produced by the driven wheel that is less likely to slip, when the vehicle is running on a road such as a split road having different friction coefficients on the road surfaces. In this select-low step, it is preferred to limit its use to a particular period of time in order to avoid the excessive use of the brake or to provide backup means for suspending the select-low step in the event of the brake being overheated.

After P65 or P66, it is discriminated in P67 whether or not the present slip ratio is larger than S=0.02. If YES in P67, the throttle valve 13 is regulated for the slip control by way of the feedback control in P68. In this case, the target throttle opening Tn of the throttle valve 13 is set to become the target slip ratio $S_{ET}$.

If NO in P67, it is discriminated in P69 whether or not the present slip ratio is larger than S=0.01. If YES in P69, the flow proceeds to P70 and the absorb control is made as have been described above. If NO in P69, the backup control is done in P71, as have been described above.

If YES in P61, the flow proceeds to P72 where it is discriminated whether or not a predetermined period of time has passed after the slip reduced, viz., whether or not a period of time for the recovery control has passed—170 msec in this embodiment. If NO in P72, the treatments following P73 are carried out to effect the recovery control. That is, in P73, the maximum acceleration $G_{MAX}$ of the automobile 1 is measured at the point $t_2$ of FIG. 5 and, in P74, the optimum throttle opening $T_{VO}$ capable of obtaining the maximum acceleration $G_{MAX}$ is set as shown in FIG. 15. Then, in P75, the optimum throttle opening $T_{VO}$ obtained in P74 is corrected in accordance with the present speed mode of the transmission 8. Since the torque transmitted to the driven wheels varies with the speed mode, it is noted in this embodiment that the optimum throttle opening $T_{VO}$ is set in P74 for a reference speed mode and then, in P75, the difference of the speed mode is corrected. Thereafter, in P76, the target slip ratio $S_{ET}$ for the slip control by the engine (throttle) and the target slip ratio $S_{BT}$ for the slip control by the brake are altered by estimating a road surface friction coefficient from the maximum acceleration $G_{MAX}$ obtained in P73. Alteration of the target slip ratios $S_{ET}$ and $S_{BT}$ will be described below.

After P76, the target slip ratio $S_{ET}$ for the engine control at the time of acceleration is corrected in P77. In P78, the target slip ratio $S_{ET}$ at the time of cornering is corrected and the target slip ratio $S_{ET}$ based on the maximum acceleration $G_{MAX}$ is memorized in P79. A description on P77 and P78 will be made below.

If YES in P72, it is found that the recovery control is finished so that the flow proceeds to P62 for further treatments as have been described.

Figure 11:
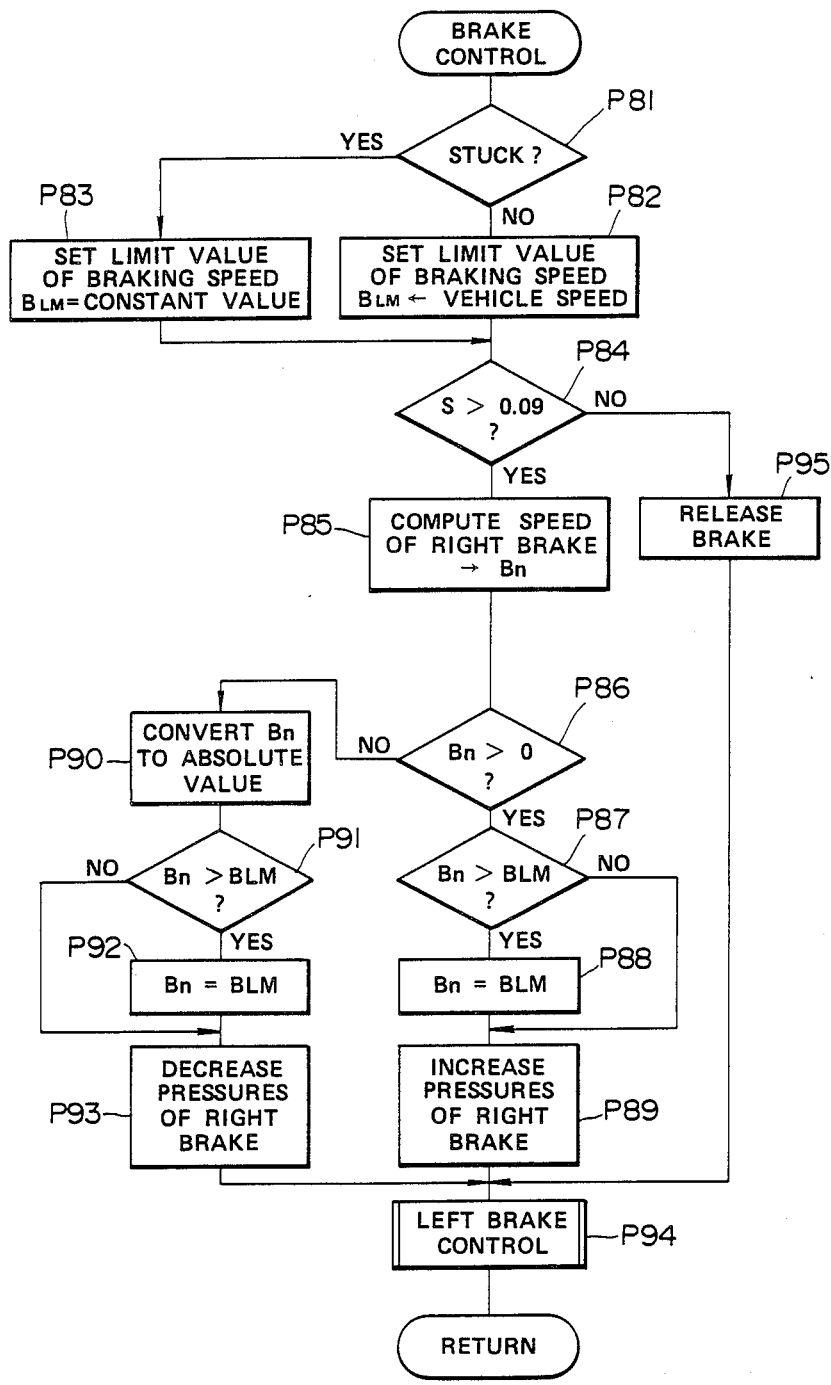

FIG. 11 (Brake Control)

The flowchart of FIG. 11 corresponds to P11 and P12 of FIG. 6.

It is discriminated in P81 whether or not the vehicle is stuck in the mud or the like. If NO in P81, the flow advances to P82 and a limit value (maximum value) $B_{LM}$ of a response speed Bn of the brake equivalent to a duty ratio for the opening or closing control of the valves SV1 to SV4 is set as a function variable in accordance with a vehicle speed—a function becoming larger as the vehicle speed gets faster. If YES in P81, the limit value $B_{LM}$ is set in P83 to be a constant value smaller than the limit value $B_{LM}$ of P82. The treatments in P82 and P83 are done with the attempt unlikely to cause any vibration to occur an account of a too fast speed of an increase or decrease in the brake pressure when the brake response speed Bn computed by the relationship (5) above is used as it is. In addition, in P83, the limit value $B_{LM}$ is set smaller than that in P82 because it is particularly undesirable that the braking force on the driving wheel is caused to vary rapidly in order to get the vehicle free from the stuck state.

After P82 or P83, it is discriminated in P84 whether or not the slip ratio is larger than S=0.09 that is the point of the brake control being suspended. If YES in P84, an operation speed Bn of the brake 22 for the right front wheel is computed in P85, which is equivalent to the speed Bn in the I-PD control of FIG. 4. Thereafter, in P86, it is discriminated whether or not the operation speed Bn is positive, vis., larger than zero. This discrimination is done by checking that the speed Bn is shown to be positive when the brake pressure is in an decreasing direction, on the one hand, and the speed Bn is shown to be negative when the brake pressure is in a increasing direction. If YES in P86, it is discriminated in P87 whether or not the speed Bn is larger than the limit value $B_{LM}$. If YES in P87, on the one hand, the speed Bn is set to the limit value $B_{LM}$ in P88 and then, in P89, the brake pressure of the right brake 22 is decreased. If NO in P87, the flow proceeds to P89 and the brake pressure thereof is increased in accordance with value Bn set in P85.

When NO at P86, it is found that Bn is a negative value or zero so that Bn is converted in P90 to the corresponding absolute value followed by the treatments in P91 to P93, inclusive. The treatments in P91 to P93 are carried out to increase the brake pressure of the right brake 22 as in substantially the same manner as those in P87 to P89, inclusive.

If NO in P84, the brake control is suspended and the brake is relased in P95.

After P89, P93 or P95, the flow proceeds to P94 where the brake pressure of the left brake 21 is increased or decreased in substantially the same manner as that of the right brake 22 is treated in P84 to P93, P95 inclusive.

It is noted herein that, if differences between the actual revolution numbers and the target revolution numbers (an actual slip ratio and the target slip ratio) are large, the integral coefficient $K_I$ in the above relationship (5), for example, is preferably corrected so as to decrease in the step between P85 and P86. This correction is preferred in terms of prevention of the impairment of acceleration by the excessive braking or an engine failure.

Alteration of Target Slip Ratios $S_{ET}$ and $S_{BT}$ (P76)

Figure 17:
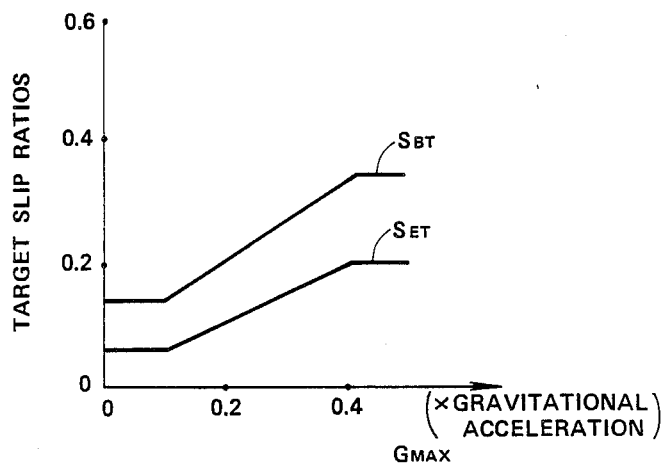
FIG. 17 is a table illustrating an example of a map for determining a target slip ratio.

In P76, the target slip ratio $S_{ET}$ for the engine control and the target slip ratio $S_{BT}$ for the brake control are altered, as demonstrated in FIG. 17, on the basis of the maximum acceleration $G_{MAX}$ measured in P73. As apparent from FIG. 17, the slip ratios $S_{ET}$ and $S_{BT}$, as a rule, get larger as the maximum acceleration $G_{MAX}$ gets larger. And a limit value is set each for the target slip ratios. It is also noted that the target slip ratio $S_{ET}$ for the engine control is set to meet requirements for the ordinary running. In other words, the target slip ratio $S_{ET}$ for the engine control is set as a slip ratio considerably smaller than the slip ratio producing the maximum gripping force with a road surface friction coefficient $\mu$ estimated from the maximum acceleration $G_{MAX}$ under consideration.

Notwithstanding the alteration of the target slip ratios $S_{ET}$ and $S_{BT}$, if a slip ratio $S_{BC}$ is set at the point of suspension of the slip control by the brake as an intermediate value between $S_{ET}$ and $S_{BT}$, the intermediate value $S_{BC}$ is not required, as a rule, to be altered. However, for example, if the intermediate value $S_{BC}$ is positioned in a constant distance at a position closer to the target slip ratio $S_{ET}$ by 20% of a deviation value of the target slip ratios $S_{ET}$ and $S_{BT}$, the intermediate value $S_{BC}$ may be altered pursuant to the alterations of the target slip ratios $S_{ET}$ and $S_{BT}$.

Correction Of Initial Value $S_1$ Of Target Slip Ratio $S_{ET}$

Figure 20:
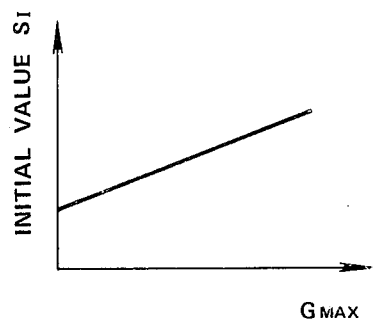
FIG. 20 is a graph illustrating an example of the automatic setting of the initial values.

As have been described above, the initial value $S_1$ is set in P9-5 and then it is set in the target slip ratio $S_{ET}$ for the engine control in the previous slip control (as corresponding to the maximum acceleration $G_{MAX}$), which is memorized or renewed in P79 (FIG. 20).

The advantage of conducting the treatment in P9-5 by the auto-mode selection, on the one hand, is to enable the previous target slip ratio $S_{ET}$ for the engine control to be used as the initial value $S_1$ without modifications and to comprehensively offset the kind of tires, weather, degrees of road surface friction coefficients and so on, as long as the vehicle is running on the same road surface. In this case, the initial value $S_1$ is set as an optimum value without nearly changing the target slip ratio $S_{ET}$ for the engine control after the start-up of the slip control. There is the advantage of selecting the initial value $S_1$ by the manual operation, not by the automatic selection, on the other hand, when the kind of tires or the like is changed substantially from the previous slip control.

Figure 21:
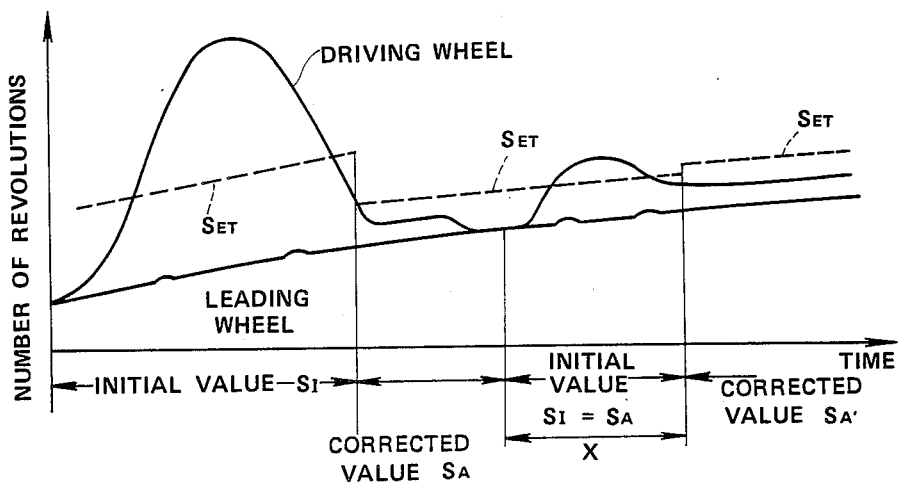
FIG. 21 is a graph illustrating a control example when the initial value is automatically set.

FIG. 21 demonstrates an example where the initial value $S_I$ is corrected to a corrected value $S_A$ during the slip control when the auto mode is selected. As will be apparent from FIG. 21, when the initial value $S_I$ for the next slip control is set using the corrected value $S_A$ in the previous slip control, viz., $S_I=S_A$, the slip control is reduced considerably faster than the previous slip control.

Figure 22:
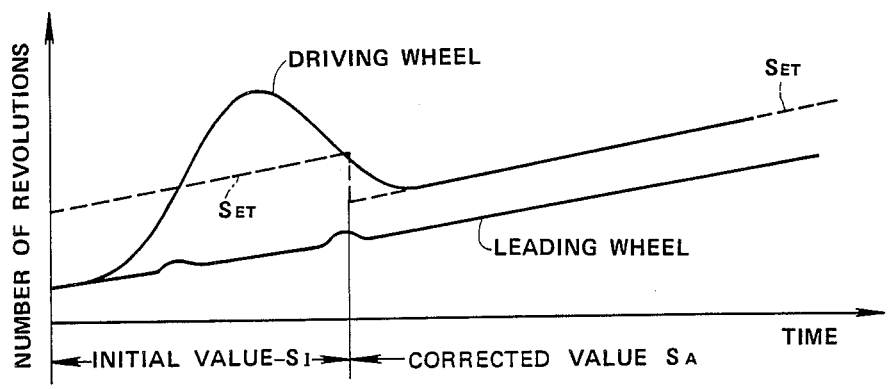
FIG. 22 is a graph illustrating a control example when the initial value is manually set.

FIG. 22 shows an example where the auto mode is cancelled and the initial value $S_I$ is selected by the level 71a or 71b.

Figure 28:
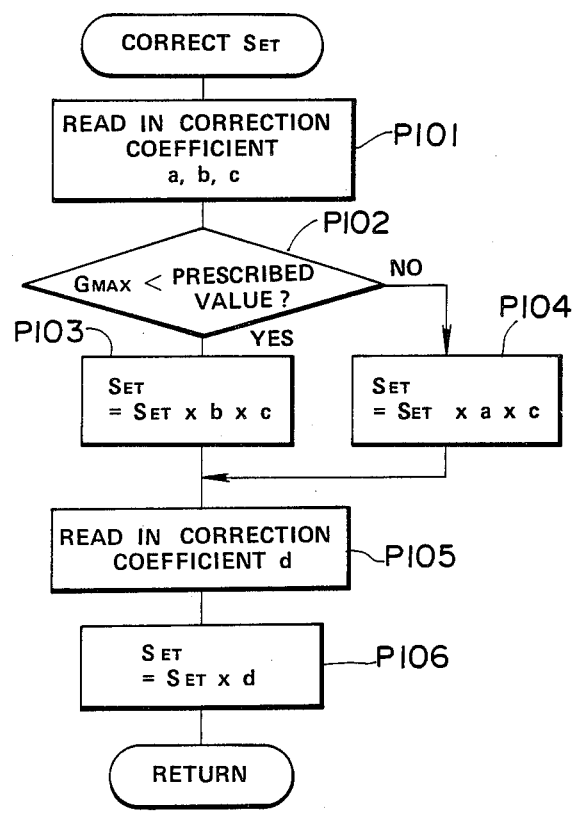
Figure 29:
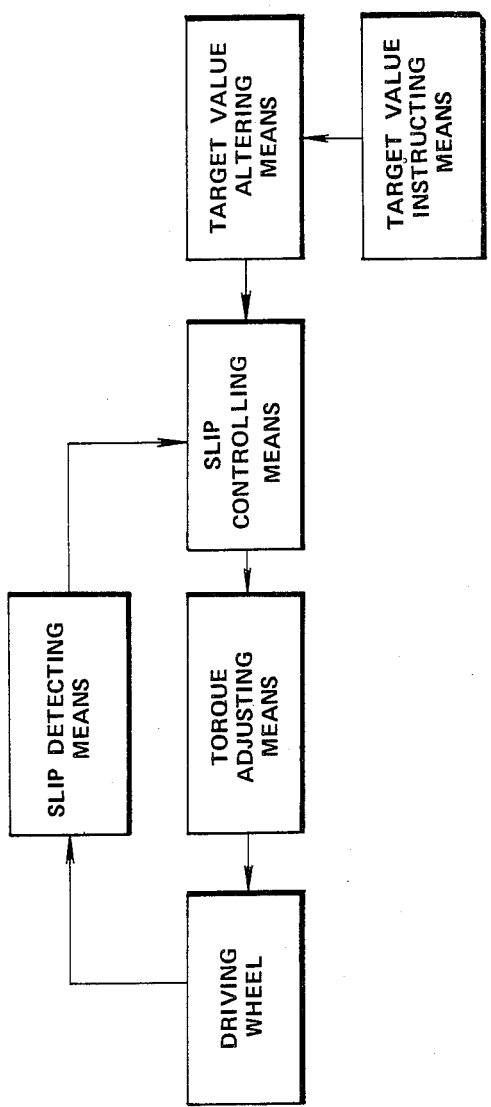
FIG. 29 is a block diagram illustrating a basic arrangement in accordance with the present invention.

Correction of Target Slip Ratio $S_{ET}$ And Acceleration Correction (FIG. 28)

Figure 23:
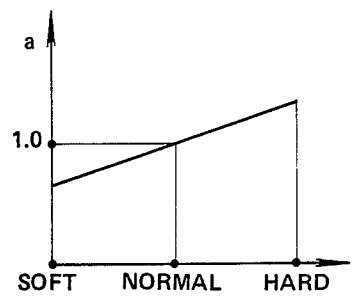
FIGS. 23 and 24 are each a graph illustrating correction coefficients of target slip ratios in accordance with a state of operation of the manual switch.
Figure 24:
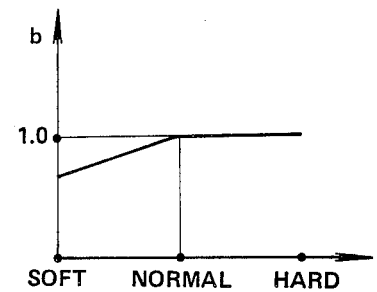
Figure 25:
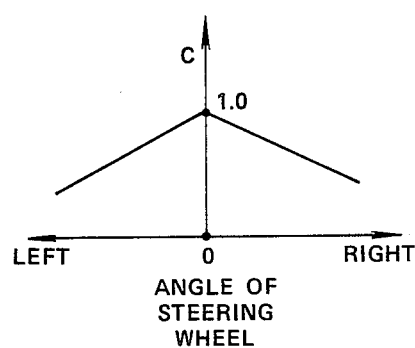
FIG. 25 is a graph illustrating correction coefficients in accordance with steered angles of a steering wheel.

The target slip ratio $S_{ET}$ at P9-3 and P78 and at P9-2 and P77 is corrected. In P101, correction coefficients a, b and c are read in from a pre-made map. The correction coefficients a and b are each a value in accordance with the selection of the mode switch 72 operative manually, as shown in FIG. 23 or FIG. 24. The correction coefficient c is a value in accordance with a steered angle of the steering wheel or a degree of the curve at the time of cornering, as shown in FIG. 25.

After P101, it is discriminated in P102 whether or not the maximum acceleration $G_{MAX}$ at P73 is smaller than a predetermined value. If YES in P102, it is found that the friction coefficient on the road surface on which the vehicle is currently running is so low that the target slip ratio $S_{ET}$ for the engine control is corrected in P103 using the correction coefficients b and c for the low road surface friction coefficient and for the cornering, respectively. If NO in P102, it is found that the friction coefficient on the road surface on which the vehicle is currently running is so high that the target slip ratio $S_{ET}$ is corrected in P104 using the correction coefficients a and c for the high road surface friction coefficient and for the cornering, respectively.

As have been described above, the target slip ratio $S_{ET}$ is corrected in a decreasing direction at the time of cornering. As shown in FIG. 13, the decrease in the target slip ratio increases the transverse force of the driven wheel, thereby leading to a stability of the vehicle. It is noted that the slip control is conducted in a range lower than a slip ratio (around S=0.2 in FIG. 13) around which the maximum gripping force is caused to occur. Accordingly, the gripping force is reduced by decreasing the target slip ratio.

Here it is also to be noted here that, when "HARD" is selected by the mode switch 72 (at the point $S_D$ in FIG. 13) and the target slip ratio is larger at this point than at the point when the maximum gripping force is produced, the manual selection is stopped and the target slip ratio is altered so as to become a target slip ratio that develops the maximum gripping force.

Figure 27:
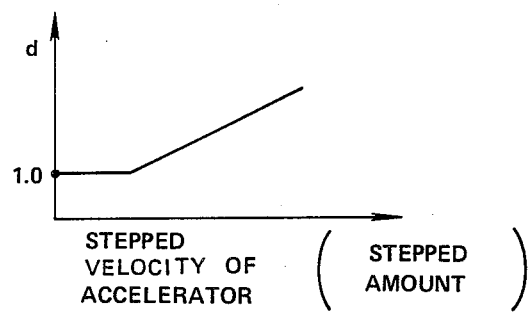
FIG. 27 is a graph illustrating correction coefficients of target slip ratios in accordance with the requirement for acceleration.

After P103 or P104, a correction coefficient d for acceleration is read in at P105 (FIG. 27). Thereafter, in P106, the target slip ratio $S_{ET}$ for the engine control at P103 or P104 is multiplied by the correction coefficient d to give a target slip ratio $S_{ET}$ corrected for acceleration.

The correction for acceleration is carried out when the requirement for acceleration is made by the operator, for example, when a stepped speed of the accelerator 70 or a stepped amount of the accelerator 70 is larger than a predetermined value, as shown in FIG. 27. In this case, the target slip ratio $S_{ET}$ is corrected in an increasing direction, that is, in a direction of producing the maximum gripping force, as compared to at the time of the ordinary running, as shown in FIG. 13. This correction may be made so as to allow the target slip ratio $S_{ET}$ to approach equally to around a point where the maximum gripping force can be produced or so as to adjust a degree of an approach of the target slip ratio $S_{ET}$ to the maximum gripping force in accordance with a degree of requirements for acceleration. As the degree of requirements for acceleration gets higher, it approaches closer to the maximum gripping force.

The following is a description on an influence of the determination of the target slip ratios $S_{ET}$ and $S_{BT}$ on the driving of the automobile 1.

(1) Gripping Forces of Driven Wheels

The target slip ratios $S_{ET}$ and $S_{BT}$ are offset as a whole in the upward or downward direction of FIG. 17. In order to make the gripping force greater, they are offset in the upward direction. This can be said true as long as the slip ratio is in the range of 0.2 to 0.3 or below because the road surface friction coefficient $\mu$ is in the increasing direction up to the slip ratio being 0.2 to 0.3 as the peculiar character of spike tires, as shown in FIG. 13.

(2) Acceleration Feelings

The acceleration feeling varies with a difference between the target slip ratios $S_{ET}$ and $S_{BT}$. Acceleration is felt greater as the difference therebetween gets smaller. As in this embodiment, when the target slip ratio $S_{ET}$ for the engine control is set smaller than the target slip ratio $S_{BT}$ for the brake control, the brake control works mainly when the slip ratio of the driven wheel is larger and the engine control works mainly when the slip ratio of the driven wheel is smaller. Accordingly, if the difference between the target slip ratios $S_{ET}$ and $S_{BT}$ is small, the engine control and the brake control work in a direction equally proportional to each other. That is, the driven wheels are driven in a state that the torque generated by the engine is reduced by the brake so that the torque to be transmitted to the driven wheels is caused to be increased without a delay in a response merely by the releasing the brake when the torque is required to be increased rapidly for acceleration.

(3) Smoothness in Acceleration

Smoothness in acceleration can be attained when the target slip ratio $S_{BT}$ for the brake control gets larger, viz., relatively large as compared to the target slip ratio $S_{ET}$ for the engine control. In this case, the engine control is caused to prevail over the brake control, thereby leading to a smooth variation in torques, which is the advantage of the engine control.

(4) Cornering Stability

A stability during the cornering can be obtained when the target slip ratio $S_{ET}$ for the engine control gets smaller, viz., relatively small compared to the target slip ratio $S_{BT}$ for the brake control. As will be apparent from FIG. 13, in the region from $S=0.2$ to $S=0.3$ or below, where the maximum gripping force is produced, the reduction in the target slip ratio can make the gripping force of the driven wheels smaller and, at the same time, make the transverse force as large as possible.

The characteristic modes as represented by (1) to (4) above may be selected automatically or manually by the operator D (mode selection).

In the embodiment described above, the target slip ratio $S_{BT}$ for the brake control is set larger than the target slip ratio $S_{ET}$ for the engine control. Thus, no brake control is carried out when a degree of the slip is small, leading to a less frequency of uses of the brake, and a burden of the brake control is lessened even when a large amount of the slip. In addition, since there is set an intermediate point ($S_{BC}$) between the target slip ratios $S_{BT}$ and $S_{ET}$, where the slip control by the brake is suspended, the brake pressure is caused to be decreased to a sufficient degree at the time of the suspension of the brake control so that a rapid variation in torques is caused unlikely to occur. Of course, the target slip ratios for the engine and brake control may be set as values identical to each other.

In accordance with the present invention, the embodiments have been described, but is should be understood that the present invention is by no means construed to be limited to the embodiments above and any changes or modifications as will be described below should be encompassed within the scope of the present invention.

a. For the simplification of the control, the target slip ratio for the brake control may be set identical to the target slip ratio for the engine control, and the brake control may be conducted for a constant period of time after the commencement of the slip control. namely, after $t_1$ in FIG. 5.

It is also possible that the target slip ratio for the brake control is set to be identical to the target slip ratio for the engine control and the brake control is carried out only when the slip of the driven wheels is being increased. That is, the brake control may be conducted when a variant of the revolution numbers of the driven wheels, $dW_D/dt$, is positive or when a variant of the slip ratio, $dS/dt$, is positive.

b. Means for adjusting the torque generated by the engine 6 may be preferably of the type regulating a factor that exerts the greatest influence upon the engine output. That is, it is preferred that the torque output is adjusted by a so-called load control. It is preferable to adjust an amount of a mixture fuel in the Otto-type engine such as a gasoline engine, and to adjust an amount of a fuel injection in a diesel engine.

In addition to the load control, the ignition timing may be adjusted in the Otto-type engine, and the timing of the fuel injection may be adjusted in the diesel engine. In a supercharged engine, a supercharged pressure may be adjusted. Of course, a power source may include, in addition to an internal combustion engine, an electric motor. In this case, the output torque may be adjusted by the adjustment of an electric power to be supplied to the motor.

The adjustment of the torque transmitted to the driven wheel may be made by one or a combination of any convenient factors capable of adjusting the torque transmitted to the driven wheel, such as the joint of the clutch 7 or a change of a gear ratio of the transmission 8 (particularly effective in the case of a non-stage (continuously variable) transmission), in addition to the engine control and the brake control.

c. The automobile 1 may include, in addition to the one with the front wheels 2 and 3 as the driven wheels, the ones with the rear wheels 4 and 5 as the driven wheels and with all the four wheels as the driven wheels.

d. In order to detect a state of the slip of the driven wheels, it may be detected directly from the revolution numbers of the driven wheels as in this embodiment above and indirectly by predicting a state of the slip thereof from a state of the vehicle. Such a state of the vehicle may include, for example, an increase in the output torque of a power source or in the number of revolutions, a variation in the accelerator opening, a variation in the revolution of the drive shaft, a state of steering wheels (cornering), a state of the vehicle body lifted (acceleration), and a loadage. In addition to these factors, a road surface friction coefficient $\mu$ upon a magnitude of atmospheric temperatures, a rainfall, a snowfall or on an iced road may be detected automatically or input manually to predict a state of the slip of the driven wheels more adequately.

e. The brake to be used for the slip control may be of the electromagnetic type as well as of the hydraulic type.

f. The hydraulic brake pressure regulating circuit in FIG. 2 and the sensors 64, 65 and 66 may be composed of a known ABS (anti-brake lock system).

g. As the state of the running to be used for the setting of the initial value $S_I$ may be used a vehicle speed or a state of the pavement of a road surface. In the case of the vehicle speed, a road surface friction coefficient is rendered relatively smaller as the the vehicle speed gets faster.

It is to be understood that the foregoing text and drawings relate to embodiments of the present invention given by way of examples but not limitation. Various other embodiments and variants are possible within the spirit and scope of the present invention.

What is claimed is:

1. In a vehicle slip control apparatus capable of preventing the driven wheel from slipping excessively on a road surface by controlling a torque transmitted to the driven wheel, the slip control apparatus comprising:
   torque adjusting means for adjusting a torque to be transmitted to the driven wheel;
   slip detecting means for detecting a state of the slip of the driven wheel on a road surface;
   slip controlling means for controlling said torque adjusting means to allow a degree of the slip of the driven wheel to become a predetermined target value in response to an output from said slip detecting means;
   target value altering means for altering said target value during the slip control; and
   target value instructing means for instructing a decrease or increase of the target value to said target value altering means in accordance with a requirement for the road holding capability of the driven wheel against the road surface.

2. The vehicle slip control apparatus according to claim 1, wherein said target value instructing means instructs so as to cause said target value to become smaller at the time of cornering than at the time of the straight running by detecting whether or not the vehicle is being cornered.

3. The vehicle slip control apparatus according to claim 2, wherein said target value instructing means is provided with a steered angle detecting means for detecting a steered angle of the steering wheel and it instructs so as to cause said target value to get smaller as the steered angle thereof gets larger.

4. The vehicle slip control apparatus according to claim 1, wherein said target value instructing means instructs so as to alter said target value to cause a transverse force of the driven wheel to get larger at the time of cornering than at the time of the straight running by detecting whether or not the vehicle is being cornered.

5. The vehicle slip control apparatus according to claim 1, wherein said target value instructing means instructs so as to cause said target value to get larger at the time of acceleration required than at the time of the ordinary running by detecting whether or not acceleration is required.

6. The vehicle slip control apparatus according to claim 5, wherein said target value instructing means is provided with an acceleration detecting means for detecting a stepped speed of an accelerator or a stepped amount of the accelerator and instructs so as to cause said target value to get larger as the stepped speed or the stepped amount thereof gets larger.

7. The vehicle slip control apparatus according to claim 1, wherein said target value instructing means instructs so as to alter said target value to cause a gripping force of the driven wheel to get larger at the time of acceleration required than at the time of the ordinary running by detecting the presence or absence of the requirement for acceleration.

8. The vehicle slip control apparatus according to claim 1, further comprising initial value setting means for setting an initial value of said target value at the start-up time of the slip control and initial value instructing means for instructing to said initial value setting means so as to cause an initial value set by said initial value setting means to become a value in accordance with a factor affecting the slip of the driven wheel and a road surface.

9. The vehicle slip control apparatus according to claim 8, wherein said initial value instructing means instructs a target value altered by said target value altering means.

10. The vehicle slip control apparatus according to claim 9, wherein said target value instructing means instructs a target value in accordance with a road surface friction coefficient estimated on the basis of acceleration of a vehicle body by detecting a degree of acceleration of the vehicle body at the time when the slip of the driven wheel becomes a predetermined value during the slip control.

11. The vehicle slip control apparatus according to claim 8, wherein said initial value instructing means is designed so as to manually instruct an initial value in accordance with a slippery degree between the driven wheel and the road surface.

12. The vehicle slip control apparatus according to claim 11, wherein said initial value instructing means is designed so as to mannually input the kind of tires having different friction coefficients.

13. The vehicle slip control apparatus according to claim 11, wherein said initial value instructing means is designed so as to manually input a slippery degree of a road surface itself.

14. The vehicle slip control apparatus according to claim 8, wherein said target value instructing means is set so as to instruct a target value in accordance with a road surface friction coefficient estimated on the basis of acceleration of the vehicle body by detecting a degree of acceleration thereof at the time when the slip of the driven wheel becomes a predetermined value during the slip control; and
   said initial value instructing means comprises first selecting means for manually selecting an initial value in accordance with a slippery degree between the driven wheel and the road surface, second selecting means for selecting the target value instructed by said target value instructing means as an initial value and switching means for manually instrucing to said initial value setting means either one of the initial values selected by said first and second selecting means.

15. The vehicle slip control apparatus according to claim 1, wherein said torque adjusting means comprises engine adjusting means for adjusting an output torque of the engine and brake adjusting means for adjusting a braking force against the driven wheel;
   said slip controlling means comprises a slip controlling means for the engine for conducting the slip control so as to cause the slip of the driven wheel to become a first target value by controlling said engine adjusting means and slip controlling means for the brake for conducting the slip control so as to cause the slip of the driven wheel to become a second target value larger than the first target value by controlling said brake adjusting means; and
   said target value altering means is set to alter said first target value alone.

16. A vehicle slip control apparatus adapted to prevent the driven wheel from slipping on pavement to an excessive degree by controlling a torque applied to the driven wheel, comprising:

torque adjusting means for adjusting the torque applied to the driven wheel;

first rotational speed detecting means for detecting a first rotational speed of the driven wheel;

second rotational speed detecting means for detecting a second rotational speed of the undriven wheel;

slip ratio determining means for determining a slip ratio of the driven wheel by using a difference between the first and second rotational speeds received from said first and second rotational speed detecting means, respectively;

slip controlling means for controlling said torque adjusting means so as to allow the slip ratio determined by said slip ratio determining means to become a predetermined target value;

target value altering means for altering said target value while a degree of the slippage is being controlled; and target value instructing means for instructing a degree of an increase or decrease in the target value to said target value altering means in order to meet a requirement for a grip of the driven wheel against payment.

17. A vehicle control apparatus as claimed in claim 16, wherein the requirement is met at least at the time of either cornering or accelerating

* * * * *